(12) United States Patent
Kishigami et al.

(10) Patent No.: US 12,222,437 B2
(45) Date of Patent: *Feb. 11, 2025

(54) RADAR DEVICE

(71) Applicant: Panasonic Holdings Corporation, Osaka (JP)

(72) Inventors: Takaaki Kishigami, Tokyo (JP); Naoya Yosoku, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/472,038

(22) Filed: Sep. 21, 2023

(65) Prior Publication Data

US 2024/0012096 A1 Jan. 11, 2024

Related U.S. Application Data

(63) Continuation of application No. 17/081,248, filed on Oct. 27, 2020, now Pat. No. 11,822,002, which is a
(Continued)

(30) Foreign Application Priority Data

Mar. 25, 2015 (JP) ................................. 2015-061979

(51) Int. Cl.
*G01S 7/02* (2006.01)
*G01S 7/282* (2006.01)
(Continued)

(52) U.S. Cl.
CPC ............ *G01S 7/023* (2013.01); *G01S 7/0234* (2021.05); *G01S 13/42* (2013.01);
(Continued)

(58) Field of Classification Search
CPC ........ G01S 7/023; G01S 7/0234; G01S 13/42; G01S 13/4463; G01S 7/282; G01S 7/352;
(Continued)

(56) References Cited

U.S. PATENT DOCUMENTS

| 3,268,890 A | 8/1966 | Birge |
| 4,755,821 A | 7/1988 | Itoh et al. |

(Continued)

FOREIGN PATENT DOCUMENTS

| CN | 102414574 A | 4/2012 |
| JP | 2011526370 A | 10/2011 |

(Continued)

OTHER PUBLICATIONS

Cadzow, "Direction-of-Arrival Estimation Using Signal Subspace Modeling," IEEE Transactions on Aerospace and Electronic Systems, 28(1), Jan. 1992, pp. 64-79 (16 total pages).

(Continued)

*Primary Examiner* — Olumide Ajibade Akonai
(74) *Attorney, Agent, or Firm* — Seed IP Law Group LLP

(57) ABSTRACT

A radar transmitter transmits a radar signal through a transmitting array antenna at a predetermined transmission period, and a radar receiver receives a reflected wave signal which is the radar signal reflected by a target through a receiving array antenna. A transmitting array antenna and a receiving array antenna each include multiple subarray elements, the subarray elements in the transmitting array antenna and the receiving array antenna are linearly arranged in a first direction, each subarray element includes multiple antenna elements, the subarray element has a dimension larger than a predetermined antenna element spacing in the first direction, and an absolute value of a difference between a subarray element spacing of the transmitting array antenna and a subarray element spacing of the (Continued)

receiving array antenna is equal to the predetermined antenna element spacing.

10 Claims, 13 Drawing Sheets

Related U.S. Application Data continuation of application No. 16/855,710, filed on Apr. 22, 2020, now Pat. No. 10,854,992, which is a continuation of application No. 16/596,206, filed on Oct. 8, 2019, now Pat. No. 10,673,149, which is a continuation of application No. 16/170,755, filed on Oct. 25, 2018, now Pat. No. 10,615,516, which is a continuation of application No. 15/067,172, filed on Mar. 10, 2016, now Pat. No. 10,141,657.

(51) Int. Cl.
| | |
|---|---|
| G01S 7/35 | (2006.01) |
| G01S 13/02 | (2006.01) |
| G01S 13/42 | (2006.01) |
| G01S 13/44 | (2006.01) |
| G01S 13/931 | (2020.01) |
| H01Q 21/08 | (2006.01) |
| H01Q 21/22 | (2006.01) |

(52) U.S. Cl.
CPC ......... *G01S 13/4463* (2013.01); *H01Q 21/08* (2013.01); *G01S 7/282* (2013.01); *G01S 7/352* (2013.01); *G01S 2013/0245* (2013.01); *G01S 13/931* (2013.01); *H01Q 21/22* (2013.01)

(58) Field of Classification Search
CPC ........... G01S 13/931; G01S 2013/0245; G01S 13/22; G01S 13/26; G01S 13/284; G01S 13/325; G01S 7/032; G01S 7/285; H01Q 21/08; H01Q 21/22
See application file for complete search history.

(56) References Cited

U.S. PATENT DOCUMENTS

| | | | |
|---|---|---|---|
| 6,496,158 B1 | 12/2002 | Ksienski et al. | |
| 7,064,710 B1 | 6/2006 | Ksienski et al. | |
| 8,049,660 B2 | 11/2011 | Mizutani et al. | |
| 8,248,298 B2 | 8/2012 | Lalezari | |
| 9,310,478 B2* | 4/2016 | Gross | H01Q 1/3233 |
| 10,168,419 B2* | 1/2019 | Trummer | G01S 7/026 |
| 10,230,176 B2 | 3/2019 | Natsume | |
| 10,615,516 B2* | 4/2020 | Kishigami | G01S 13/284 |
| 2010/0328157 A1 | 12/2010 | Culkin et al. | |
| 2011/0063158 A1 | 3/2011 | Kondou | |
| 2011/0080314 A1 | 4/2011 | Wintermantel | |
| 2011/0285582 A1 | 11/2011 | Zhang et al. | |
| 2012/0050091 A1 | 3/2012 | Inami et al. | |
| 2013/0088393 A1 | 4/2013 | Lee et al. | |
| 2014/0125511 A1 | 5/2014 | Longstaff | |
| 2014/0355706 A1 | 12/2014 | Zhou | |
| 2014/0375525 A1* | 12/2014 | Shi | H01Q 21/068 343/893 |
| 2015/0084832 A1 | 3/2015 | Ai et al. | |
| 2015/0253419 A1 | 9/2015 | Alland | |
| 2015/0253420 A1 | 9/2015 | Alland | |
| 2016/0172767 A1 | 6/2016 | Ray | |
| 2016/0218425 A1 | 7/2016 | Mohamadi | |
| 2017/0244462 A1 | 8/2017 | Wei et al. | |

FOREIGN PATENT DOCUMENTS

| | | |
|---|---|---|
| JP | 2012120144 A | 6/2012 |
| JP | 2014085317 A | 5/2014 |
| JP | 2014153142 A | 8/2014 |

OTHER PUBLICATIONS

Chinese Search Report dated Nov. 19, 2019 for the related Chinese Patent Application No. 201610064582.9.
D. Wilcox et al, "On MIMO Radar Subarrayed Transmit Beamforming", IEEE Transactions on Signal Processing, vol. 60, No. 4, Apr. 2012.
Daniel R. Fuhrmann et al, "Signaling Strategies for the Hybrid MIMO Phased-Array Radar", IEEE Journal of Selected Topics in Signal Processing, vol. 4, No. 1, Feb. 2010.
English Translation of the First Office Action dated Nov. 19, 2019 for the related Chinese Patent Application No. 201610064582.9.
Hongbin Li et al, "Transmit Subaperturing for MIMO Radars with Co-Located Antennas".
Jian Li et al., "MIMO Radar with Colocated Antennas", Signal Processing Magazine, IEEE vol. 24, Issue: 5, pp. 106-114, Sep. 2007.
Li Li et al, "Sparse MI MO Architectures For Through-The-Wall Imaging".
Notification of Reasons for Refusal in Japan dated Oct. 23, 2019 for the related Japanese Patent Application No. 2018-160126. (With English Translation).
Palghat P. Vaidyanathan et al, "Sparse Sensing With Co-Prime Samplers and Arrays", IEEE Transactions on Signal Processing, vol. 59, No. 2, Feb. 2011.
Thomas D. Backes, "Parameter Identifiability in a Phased-subarray MIMO Radar".
Y. Huang et al, "FMCW Based MIMO Imaging Radar for Maritime Navigation", Progress In Electromagnetics Research, vol. 115, p. 327-342, 2011.

* cited by examiner

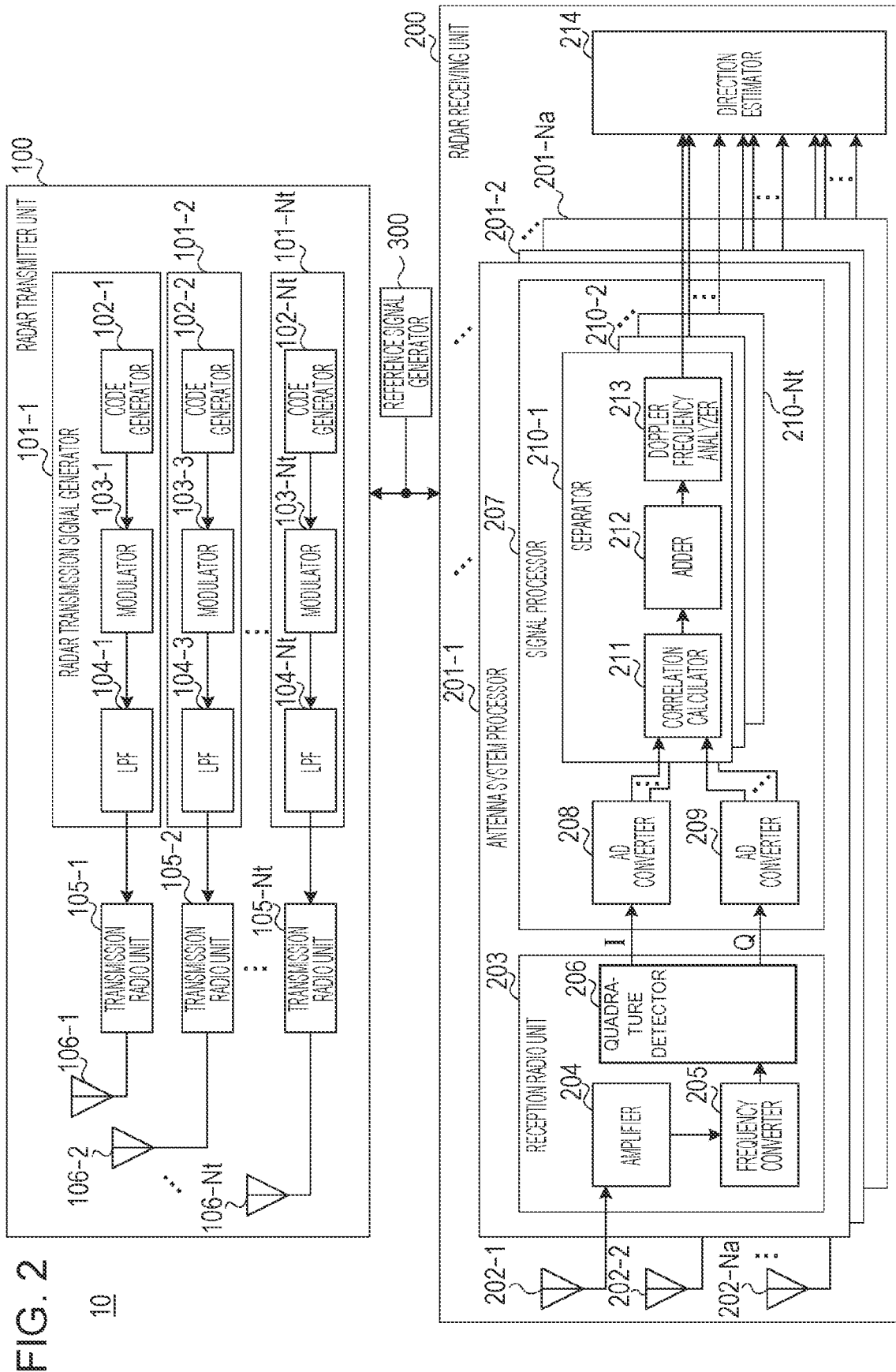

RADAR DEVICE

BACKGROUND

Technical Field

The present disclosure relates to a radar device.

Description of the Related Art

Recent studies have been made on a radar device using a radar transmission signal of a short wavelength including microwave or milliwave with which a high resolution is achieved. Development is required on a radar device (wide-angle radar device) that detects objects (targets) including a pedestrian as well as a vehicle in a wide-angle range in order to improve outdoor safety.

A known example of such a radar device is a pulse radar device that repeatedly emits pulsed waves. A wide-angle pulse radar that detects a vehicle and a pedestrian in a wide-angle range receives a mixture of multiple reflected waves from a target (for example, a vehicle) at a short distance and a target (for example, a pedestrian) at a long distance. This requires (1) a radar transmitter to have a configuration to transmit pulsed waves or pulse-modulated waves having an auto-correlation characteristic (hereinafter, referred to as a low range sidelobe characteristic) that achieves low range sidelobes, and (2) a radar receiver to have a configuration with a wide reception dynamic range.

Examples of the configuration of the wide-angle radar device include the following two configurations.

The first configuration transmits pulsed waves or modulated waves as radar waves by mechanical or electrical scanning using a directional beam of a narrow angle (beam width of a few degrees), and receives reflected waves using a narrow-angle directional beam. With this configuration, the scanning needs to be performed a large number of times to obtain a high resolution, which leads to a degradation in the performance of following a fast moving target.

The second configuration uses a method (direction of arrival (DOA) estimation) of receiving reflected waves through an array antenna including multiple antennas (antenna elements), and estimating the arrival angle of the reflected waves using a signal processing algorithm based on a reception phase difference corresponding to an antenna spacing. This configuration allows the radar receiver to estimate the arrival angle even when a frequency of scanning of a transmission beam on the radar transmitter is reduced, thereby achieving a shortened scanning time and an improved following performance as compared to the first configuration. Examples of DOA estimation methods include a Fourier transform based on matrix calculation, a Capon method and a linear prediction (LP) method based on inverse matrix calculation, and a multiple signal classification (MUSIC) and an estimation of signal parameters via rotational invariance techniques (ESPRIT) based on eigenvalue calculation.

Disclosed is a radar device (also referred to as a MIMO radar) that includes multiple antennas (array antennas) on the radar transmitter as well as the radar receiver and performs beam scanning by signal processing using transmitting and receiving array antennas (see Jian Li, Stoica, Petre, "MIMO Radar with Colocated Antennas," Signal Processing Magazine, IEEE Vol. 24, Issue: 5, pp. 106-114, 2007, for example).

In order to achieve a high directional gain of an array antenna, antenna elements (hereinafter, referred to as array elements) included in the array antenna are each formed of a subarray antenna including multiple antenna elements in some cases.

As for the element spacing of the array antenna, it is difficult to arrange the array elements at spacings smaller than the size of the array element. However, the dimension of the array element having a subarray antenna configuration is large, and accordingly a large spacing is needed between subarray antennas, which may generate a grating lobe on a directivity pattern of the array antenna.

BRIEF SUMMARY

One non-limiting and exemplary embodiment of the present disclosure provides a radar device that can prevent generation of an unnecessary grating lobe and achieve a desired directivity pattern even when arranged in the subarray antenna configuration.

In one general aspect of the present disclosure, the techniques disclosed here feature a radar device including: radar transmission circuitry which, in operation, transmits a radar signal through a transmitting array antenna at a predetermined transmission period; and radar reception circuitry which, in operation, receives a reflected wave signal which is the radar signal reflected by an object through a receiving array antenna. The transmitting array antenna and the receiving array antenna each include multiple subarray elements. The subarray elements are linearly arranged in a first direction in each of the transmitting array antenna and the receiving array antenna. Each subarray element includes multiple antenna elements. A dimension of each subarray element in the first direction is larger than a predetermined antenna element spacing. An absolute value of a difference between a subarray element spacing of the transmitting array antenna and a subarray element spacing of the receiving array antenna is equal to the predetermined antenna element spacing.

One aspect of the present disclosure can prevent generation of an unnecessary grating lobe and achieve a desired directivity pattern even in a subarray antenna configuration.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

FIG. 2 is a block diagram of the configuration of a radar device according to an embodiment of the present disclosure;

DETAILED DESCRIPTION

Underlying Knowledge Forming Basis of the Present Disclosure

Figure 1A:
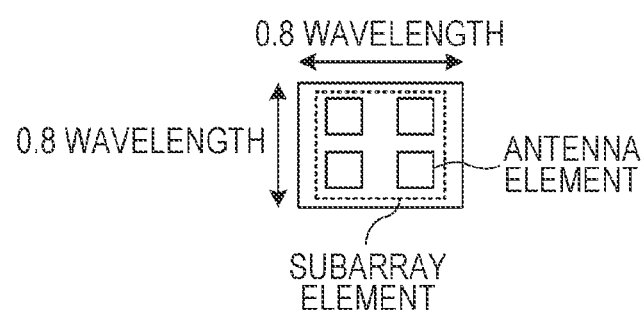
FIG. 1A illustrates an exemplary configuration of a subarray element.

FIG. 1A illustrates an exemplary subarray configuration (hereinafter, also referred to as a subarray element) including an antenna element. The subarray element illustrated in FIG. 1A includes four antenna elements in a 2×2 matrix. In the example illustrated in FIG. 1A, the subarray element has a dimension of 0.8 wavelength in both the horizontal and vertical directions.

Figure 1B:
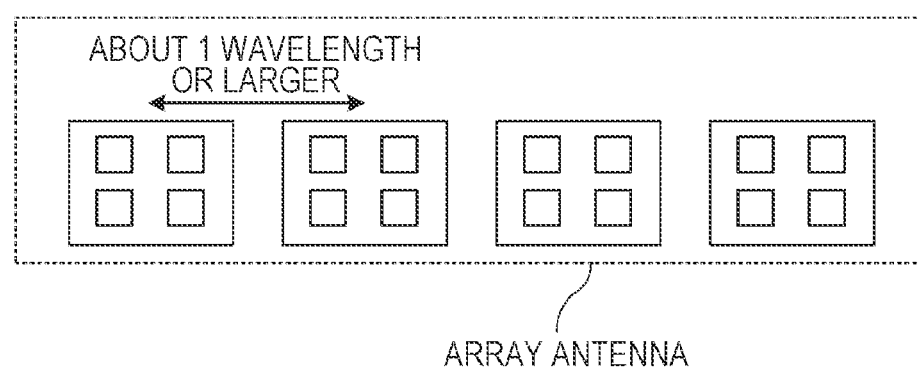
FIG. 1B illustrates an exemplary configuration of an array antenna including the subarray elements.

FIG. 1B illustrates an exemplary array antenna including a linear arrangement of the four subarray elements illustrated in FIG. 1A. Since each subarray element has a dimension of 0.8 wavelength (refer to FIG. 1A) as illustrated in FIG. 1B, a spacing between the subarray elements needs to be about 1 wavelength or larger.

For example, an array element spacing (predetermined element spacing) for preventing generation of a grating lobe in a range of ±90° of a main lobe is 0.5 wavelength. In the array antenna illustrated in FIG. 1B, the subarray elements have an element spacing of about 1 wavelength or larger, and thus it is difficult to obtain a predetermined element spacing. This results in generation of a grating lobe in the range of ±90° of the main lobe.

As described above, when the dimension of the subarray element is 0.5 wavelength or larger, it may be difficult to set the element spacing of the array antenna to be 0.5 wavelength. Thus, an unnecessary grating lobe occurs in the range of ±90° of the main lobe, which generates a virtual image at angle determination, thereby leading to a false detection.

Published Japanese Translation of PCT International Application No. 2011-526370 (hereinafter, referred to as Patent Document 1) discloses an array antenna configuration including a subarray element having a width d equal to 1 wavelength approximately. In Patent Document 1, transmitting antennas Tx0 and Tx1 has an element spacing of 6 wavelengths, and receiving antennas RX0, RX1, RX2, and RX3 has an element spacing of 1.5 wavelengths±($\lambda/8$) (where $\lambda$ represents 1 wavelength). With the array antenna configuration disclosed in Patent Document 1, time-divisional transmission of a radar transmission signal is performed through the transmitting antennas Tx0 and Tx1, and a reception signal for the radar transmission signal transmitted from each of the transmitting antennas Tx0 and Tx1 is acquired through the receiving antennas RX0, RX1, RX2, and RX3.

With this configuration, a phase difference due to the difference of the positions of the transmitting antennas is superimposed on the reception signal acquired by a receiving array antenna. This achieves a virtually increased opening length of the receiving antennas. Hereinafter, a virtual receiving array antenna having an increased effective opening length due to antenna element arrangements of transmitting and receiving array antennas is referred to as a "virtual receiving array."

In Patent Document 1, however, the receiving array antennas have an element spacing of 1.5 wavelengths±$\lambda/8$, which leads to generation of a grating lobe in a direction shifted from a main beam direction by 40° approximately.

An aspect according to the present disclosure prevents generation of an unnecessary grating lobe and achieves a desired directivity pattern even when array elements having a subarray configuration are arranged.

Hereinafter, embodiments according to the aspect of the present disclosure are described in detail with reference to the accompanying drawings. An identical reference numeral is given to any identical component common to the embodiments, and description thereof is omitted to avoid duplication.

[Radar Device Configuration]

FIG. 2 is a block diagram of the configuration of a radar device 10 according to the present embodiment.

The radar device 10 includes a radar transmitter 100, a radar receiver 200, and a reference signal generator 300.

The radar transmitter 100 generates a radar signal (radar transmission signal) of a high frequency based on a reference signal received from the reference signal generator 300. Then, the radar transmitter 100 transmits the radar transmission signal at a predetermined transmission period through a transmitting array antenna that includes multiple transmitting antennas 106-1 to 106-Nt.

The radar receiver 200 receives a reflected wave signal which is the radar transmission signal reflected by a target (not illustrated) through a receiving array antenna that includes multiple receiving antennas 202-1 to 202-Na. The radar receiver 200 processes the reflected wave signal received through the antennas 202 based on the reference signal received from the reference signal generator 300 so as to perform, for example, an existence detection and a direction estimation of the target. The target is an object to be detected by the radar device 10, and examples thereof include a vehicle and a person.

The reference signal generator 300 is connected to the radar transmitter 100 and the radar receiver 200. The reference signal generator 300 supplies the common reference signal to both of the radar transmitter 100 and the radar receiver 200 to synchronize processing of the radar transmitter 100 and the radar receiver 200.

[Configuration of Radar Transmitter 100]

The radar transmitter 100 includes radar transmission signal generators 101-1 to 101-Nt, transmission radio units 105-1 to 105-Nt, and the transmitting antennas 106-1 to 106-Nt. Thus, the radar transmitter 100 includes Nt transmitting antennas 106, and each transmitting antenna 106 is connected to the corresponding radar transmission signal generator 101 and the corresponding transmission radio unit 105.

The radar transmission signal generator 101 generates a timing clock obtained by multiplying the reference signal received from the reference signal generator 300 by a predetermined value, and generates the radar transmission signal based on the generated timing clock. Then, the radar transmission signal generator 101 repeatedly outputs the radar transmission signal at a predetermined radar transmission period (Tr). The radar transmission signal is expressed in $r_z(k, M) = I_z(k, M) + jQ_z(k, M)$. In this expression, z represents an index corresponding to each transmitting antenna 106, and is $z = 1, \ldots, Nt$, and j represents the imaginary unit, k represents a discrete time, and M represents an ordinal number of the radar transmission period.

Each radar transmission signal generator 101 includes a code generator 102, a modulator 103, and a low pass filter (LPF) 104. The following describes components of the radar transmission signal generator 101-z corresponding to the z-th ($z = 1, \ldots, Nt$) transmitting antenna 106.

Specifically, the code generator 102 generates codes $a(z)_n$ ($n = 1, \ldots, L$) (pulse codes) in a code sequence of a code length L at each radar transmission period Tr. Codes having low correlation or no correlation therebetween are used as the codes $a(z)_n$ ($z = 1, \ldots, Nt$) generated by each of the code generators 102-1 to 102-Nt. Examples of the code sequence include a Walsh-Hadamard code, an M-sequence code, and a Gold code.

The modulator 103 provides the codes $a(z)_n$ received from the code generator 102 with a pulse modulation (amplitude modulation, amplitude shift keying (ASK), and pulse shift keying) or a phase modulation (phase shift keying), and outputs a modulated signal to the LPF 104.

The LPF 104 outputs a signal component of the modulated signal received from the modulator 103, which is not higher than a predetermined threshold band, as a baseband radar transmission signal to the transmission radio unit 105.

The z-th ($z = 1, \ldots, Nt$) transmission radio unit 105 performs a frequency conversion on the baseband radar transmission signal output from the z-th radar transmission signal generator 101, generates a radar transmission signal in a carrier frequency (radio frequency or RF) band, amplifies this radar transmission signal through a transmission amplifier to have a predetermined transmission electric power P [dB], and outputs the amplified radar transmission signal to the z-th transmitting antenna 106.

The z-th ($z = 1, \ldots, Nt$) transmitting antenna 106 emits the radar transmission signal output from the z-th transmission radio unit 105 into space.

Figure 3:
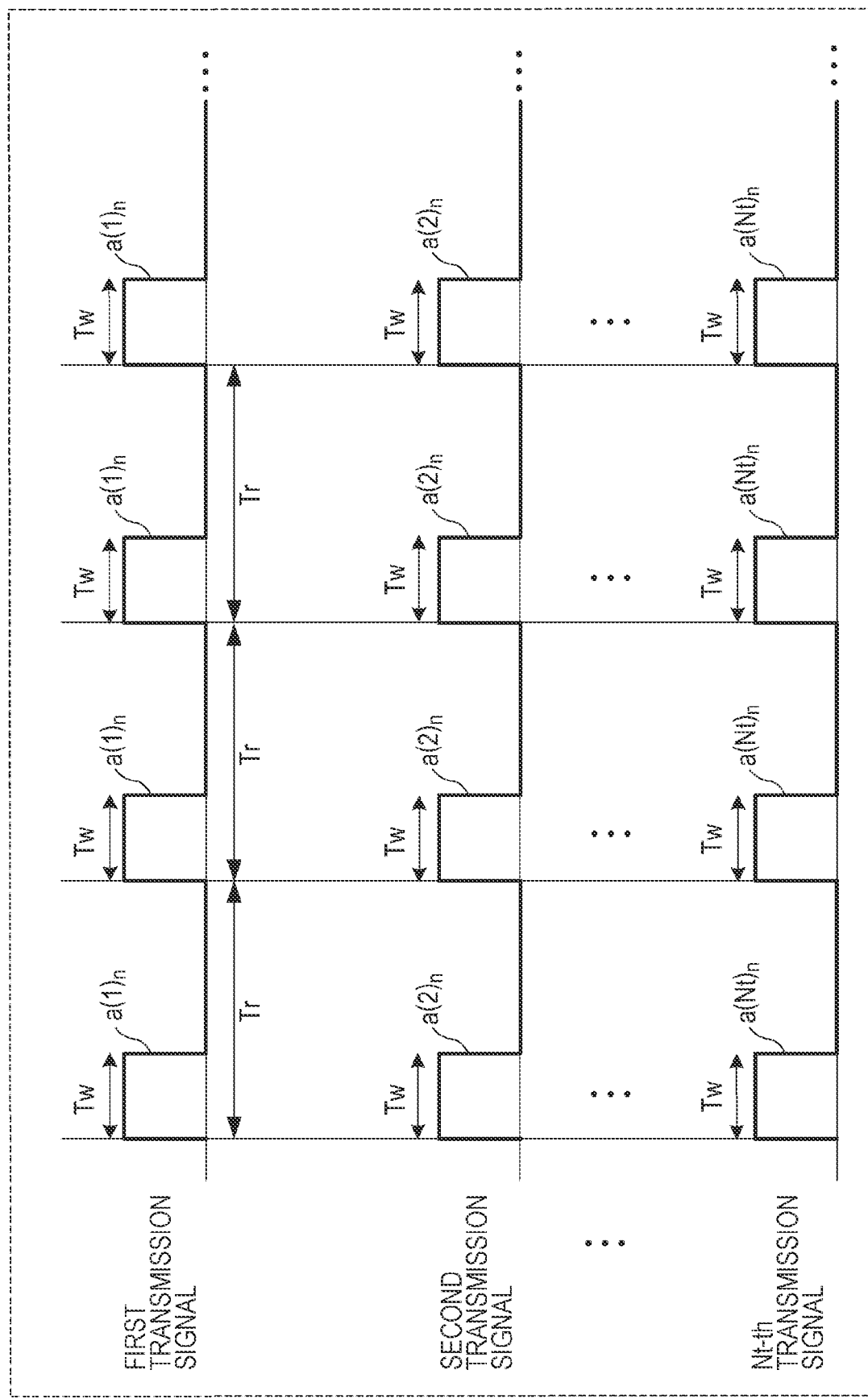
FIG. 3 illustrates an exemplary radar transmission signal according to the embodiment of the present disclosure.

FIG. 3 illustrates the radar transmission signal transmitted from the Nt transmitting antennas 106 of the radar transmitter 100. A code transmission slot Tw includes a pulse code sequence of the code length L. In each radar transmission period Tr, the pulse code sequence is transmitted in the code transmission slot Tw, and no signal is transmitted in the remaining slot (Tr−Tw). A pulse modulation using No samples is performed per one pulse code ($a(z)_n$), and thus Nr (=No×L) sample signals are included in each code transmission slot Tw. In other words, the modulator 103 employs a sampling rate of (No×L)/Tw. The slot (Tr−Tw) with no signal includes Nu samples.

Figure 4:
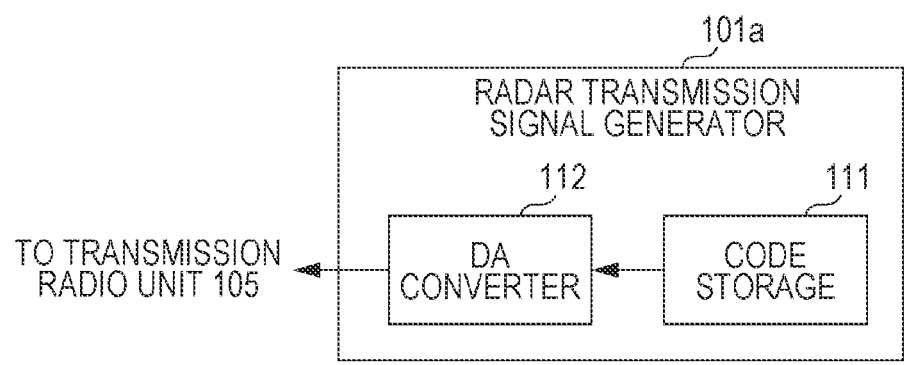
FIG. 4 is a block diagram of another configuration of a radar transmission signal generator according to the embodiment of the present disclosure.

The radar transmitter 100 includes, in place of the radar transmission signal generator 101, a radar transmission signal generator 101a illustrated in FIG. 4. The radar transmission signal generator 101a does not include the code generator 102, the modulator 103, or the LPF 104, which are illustrated in FIG. 2, but includes a code storage 111 and a DA converter 112 instead. The code storage 111 previously stores a code sequence generated by the code generator 102 (FIG. 2), and cyclically and sequentially reads out the stored code sequence. The DA converter 112 converts a code sequence (digital signal) output from the code storage 111 into an analog signal.

[Configuration of Radar Receiver 200]

In FIG. 2, the radar receiver 200 includes Na receiving antennas 202, constituting an array antenna. The radar receiver 200 also includes Na antenna system processors 201-1 to 201-Na and a direction estimator 214.

Each receiving antenna 202 receives the reflected wave signal which is the radar transmission signal reflected by the target (object), and outputs the reflected wave signal thus received as a reception signal to the corresponding antenna system processor 201.

Each antenna system processor 201 includes a reception radio unit 203 and a signal processor 207.

The reception radio unit 203 includes an amplifier 204, a frequency converter 205, and an quadrature detector 206. The reception radio unit 203 generates a timing clock obtained by multiplying the reference signal received from the reference signal generator 300 by a predetermined value, and operates based on this generated timing clock. Specifically, the amplifier 204 amplifies the reception signal received from the receiving antenna 202 to a predetermined level, and the frequency converter 205 performs a frequency conversion of a high frequency band of the reception signal into a baseband. Then, the quadrature detector 206 converts this reception signal in the baseband into a reception signal in a baseband including an I signal and a Q signal.

The signal processor 207 includes AD converters 208 and 209 and separators 210-1 to 210-Nt.

The AD converter 208 receives the I signal from the quadrature detector 206, and the AD converter 209 receives the Q signal from the quadrature detector 206. The AD converter 208 performs discrete time sampling on a baseband signal including the I signal so as to convert the I signal into digital data. The AD converter 209 performs discrete time sampling on a baseband signal including the Q signal so as to convert the Q signal into digital data.

The samplings performed by the AD converters 208 and 209 include Ns discrete samplings in a duration Tp (=Tw/L) of one sub pulse in the radar transmission signal. In other words, Ns oversamplings are performed per one sub pulse.

The following description uses an I signal $I_r(k, M)$ and a Q signal $Q_r(k, M)$ to express a baseband reception signal as the output from the AD converters 208 and 209 at the discrete time k in the M-th radar transmission period Tr[M], as a complex signal $x(k, M) = I_r(k, M) + jQ_r(k, M)$. In the following, the discrete time k is defined with reference to a timing (k=1) at which the radar transmission period (Tr) starts, and the signal processor 207 periodically operates until $k = (Nr+Nu)Ns/No$, which is a last sample point before the radar transmission period Tr ends. Namely, the discrete time k has a value of k=1, ..., (Nr+Nu)Ns/No, where j is the imaginary unit.

The signal processor 207 includes the Nt separators 210 whose number is equal to the number of systems as the number of the transmitting antennas 106. Each separator 210 includes a correlation calculator 211, an adder 212, and a Doppler frequency analyzer 213. The configuration of the z-th (z=1, ..., Nt) separator 210 is described below.

The correlation calculator 211 calculates a correlation between the discrete sample value x(k, M) and the pulse codes a(z)$_n$ (where z=1, ..., Nt, and n=1, ..., L) of the code length L transmitted through the radar transmitter 100. The discrete sample value x(k, M) includes the discrete sample values I$_r$(k, M) and Q$_r$(k, M) received from the AD converters 208 and 209 at each radar transmission period Tr. For example, the correlation calculator 211 calculates a sliding correlation between the discrete sample value x(k, M) and the pulse codes a(z)$_n$. For example, a correlation calculated value AC$_{(z)}$(k, M) for the sliding correlation at the discrete time k in the M-th radar transmission period Tr[M] is calculated based on an expression below.

$$AC_{(z)}(k, M) = \sum_{n=1}^{L} x(k + N_s(n-1), M)a(z)_n^* \quad (1)$$

In the above expression, an asterisk (*) represents a complex conjugate operator.

The correlation calculator 211 calculates the correlation over a duration of k=1, ..., (Nr+Nu)Ns/No in accordance with, for example, Expression (1).

Figure 5:
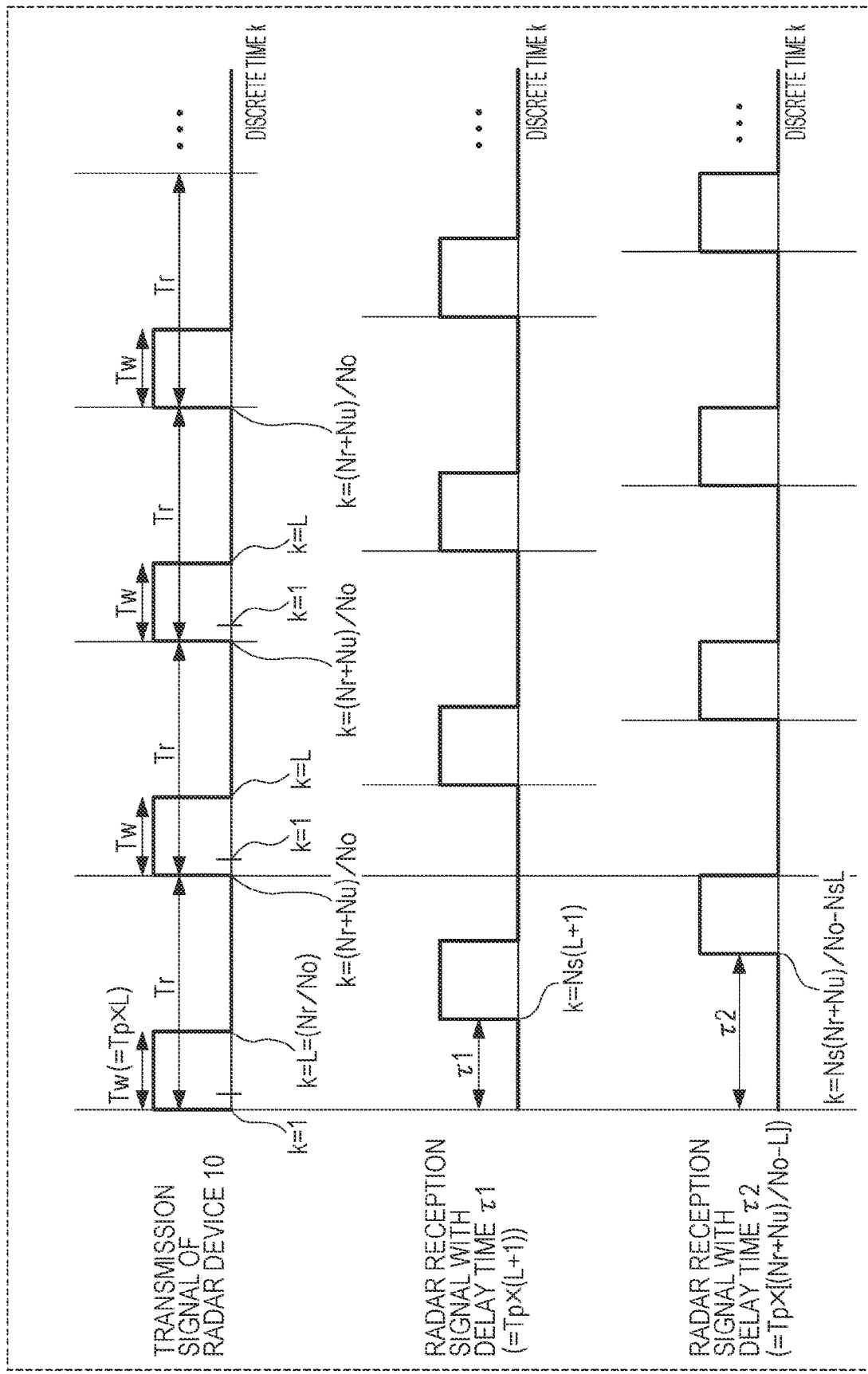
FIG. 5 illustrates an example of a transmission timing and a measurement range of the radar transmission signal according to the embodiment of the present disclosure.

The correlation calculator 211 is not limited to the correlation calculation for k=1, ..., (Nr+Nu)Ns/No, and may limit a measurement range (that is, the range of k) depending on the range of existence of the target as a measurement target of the radar device 10. This allows the radar device 10 to achieve a reduction in the calculation amount of the correlation calculator 211. For example, the correlation calculator 211 may limit the measurement range to k=Ns (L+1), ..., (Nr+Nu)Ns/No−NsL. In this case, as illustrated in FIG. 5, the radar device 10 does not perform measurement in the time slot corresponding to the code transmission slot Tw.

Thus, in the radar device 10, the correlation calculator 211 does not perform processing in a duration (at least a duration less than τ1) in which the radar transmission signal going directly into the radar receiver 200, which achieves a measurement free from the influence of this phenomenon. When the measurement range (range of k) of the correlation calculation is limited, the measurement range (range of k) of processing at the adder 212, the Doppler frequency analyzer 213, and the direction estimator 214 to be described later may be limited as well. This achieves a reduced processing amount at each component and thus a reduced electric power consumption at the radar receiver 200.

At each discrete time k in the M-th radar transmission period Tr, the adder 212 performs an addition (coherent integration) of the correlation calculated value AC$_{(z)}$(k, M) received from the correlation calculator 211 over a duration (Tr×Np) that is a predetermined number (Np) of the radar transmission periods Tr. This addition (coherent integration) processing involving the number Np of additions over the duration (Tr×Np) is performed by an expression below.

$$CI_{(z)}(k, m) = \sum_{g=1}^{N_p} AC_{(z)}(k, N_p(m-1) + g) \quad (2)$$

In this expression, CI$_{(z)}$(k, m) represents the sum (hereinafter, also referred to as the correlation sum) of the correlation calculated values, where Np is an integer equal to or larger than one, and m is an integer equal to or larger than one as an ordinal number of the number of additions in units of the number Np of additions at the adder 212. The value z is z=1, ..., Nt.

The adder 212 performs Np additions in units of the output from the correlation calculator 211 obtained per the radar transmission period Tr. Specifically, the adder 212 calculates the correlation value CI$_{(z)}$(k, m) as the sum of the correlation calculated values AC$_{(z)}$(k, Np(m−1)+1) to AC$_{(z)}$(k, Np×m) for each discrete time k. Thus, the adder 212 can achieve an improved SNR of the reflected wave signal through the Np additions of the correlation calculated value in a range in which the reflected wave signals from the target have a high correlation. This then achieves an improved measurement performance related to estimation of an arrival distance of the target.

In order to obtain an ideal addition gain, a condition for having a phase component of each correlation calculated value within a certain range needs to be satisfied in an addition time period for the number Np of additions of the correlation calculated value. Thus, the number Np of additions is preferably set based on an expected maximum moving speed of the target as a measurement target. This is because a larger expected maximum speed of the target results in a larger amount of change of a Doppler frequency included in a reflected wave from the target, and thus a shorter time duration in which a high correlation is obtained. In this case, the number Np of additions is small, which leads to a small gain improvement effect of the addition by the adder 212.

The Doppler frequency analyzer 213 performs the coherent integration for the same discrete time k in units of CI$_{(z)}$(k, Nc(w−1)+1) to CI$_{(z)}$(k, Nc×w) as Nc outputs obtained at each discrete time k from the adder 212. For example, the Doppler frequency analyzer 213 corrects a phase variation φ(fs)=2πfs(Tr×Np)Δφ in accordance with 2Nf different Doppler frequencies fsΔφ as expressed in an expression below, and then performs the coherent integration.

$$FT\_CI_{(z)}^{Nant}(k, f_s, w) = \sum_{q=0}^{N_c-1} CI_{(z)}(k, N_c(w-1) + q + 1)\exp[-j\phi(f_s)q] \quad (3)$$

$$= \sum_{q=0}^{N_c-1} CI_{(z)}(k, N_c(w-1) + q + 1)$$

$$\exp[-j2\pi f_s T_r N_p q \Delta\phi]$$

In this expression, FT_CI$_{(z)}^{Nant}$(k, fs, w) represents the w-th output of the Doppler frequency analyzer 213, and represents a result of the coherent integration of the Doppler frequency fsΔφ by the Nant-th antenna system processor 201 at the discrete time k. Also in the expression, Nant=1 to Na, fs=−Nf+1, ..., 0, ..., Nf, k=1, ..., (Nr+Nu)Ns/No, w is an integer equal to or larger than one, and Δφ represents a phase rotation unit.

Accordingly, each antenna system processor 201 obtains $\mathrm{FT\_CI}_{(z)}^{Nant}(k, -Nf+1, w), \ldots, \mathrm{FT\_CI}_{(z)}^{Nant}(k, Nf-1, w)$ as the result of the coherent integration in accordance with 2Nf Doppler frequency components at the discrete time k, for each duration (Tr×Np×Nc) of a plurality, Np×Nc, of the radar transmission periods Tr. In the expression, j is the imaginary unit, and the value z is z=1, . . . , Nt.

For $\Delta\phi=1/Nc$, the above-described processing of the Doppler frequency analyzer 213 is equivalent to discrete Fourier transform (DFT) processing of the outputs from the adder 212 with a sampling interval Tm=(Tr×Np) and a sampling frequency fm=1/Tm.

Setting Nf to a power of two allows application of fast Fourier transform (FFT) processing at the Doppler frequency analyzer 213, thereby achieving a large reduction in the calculation amount. For Nf>Nc, the FFT processing can also be applied in a region in which q>Nc holds by performing zero filling processing that sets $\mathrm{CI}_{(z)}(k, Nc(w-1)+q)=0$, and thus the calculation amount can be largely reduced accordingly.

The Doppler frequency analyzer 213 may perform, in place of the FFT processing, processing of sequentially calculating the product sum calculation expressed in Expression (3) above. Specifically, the Doppler frequency analyzer 213 may generate a coefficient $\exp[-j2\pi f_s T_r N_p q \Delta\phi]$ for fs=−Nf+1, . . . , 0, . . . , Nf−1 for $\mathrm{CI}_{(z)}(k, Nc(w-1)+q+1)$ as the Nc outputs obtained from the adder 212 at each discrete time k, and sequentially perform the product sum calculation processing. Here, q=0 to Nc−1.

In the following, a virtual receiving array correlation vector h(k, fs, w) in expressions below represents a set of the w-th outputs $\mathrm{FT\_CI}_{(z)}^{1}(k, fs, w), \mathrm{FT\_CI}_{(z)}^{2}(k, fs, w), \ldots, \mathrm{FT\_CI}_{(z)}^{Na}(k, fs, w)$ obtained through the same processing on the Na respective antenna system processors 201. The virtual receiving array correlation vector h(k, fs, w) includes Nt×Na elements as the product of the number of transmitting antennas, Nt, and the number of receiving antennas, Na. The virtual receiving array correlation vector h(k, fs, w) is used to later describe the processing of performing a direction estimation of the reflected wave signal from the target based on a phase difference between the receiving antennas 202. Here, z=1, . . . , Nt, and b=1, . . . , Na.

$$h(k, fs, w) = \begin{bmatrix} \mathrm{FT\_CI}_{(1)}^{1}(k, fs, w) \\ \mathrm{FT\_CI}_{(2)}^{1}(k, fs, w) \\ \vdots \\ \mathrm{FT\_CI}_{(Nt)}^{1}(k, fs, w) \\ \mathrm{FT\_CI}_{(1)}^{2}(k, fs, w) \\ \mathrm{FT\_CI}_{(2)}^{2}(k, fs, w) \\ \vdots \\ \mathrm{FT\_CI}_{(Nt)}^{2}(k, fs, w) \\ \vdots \\ \mathrm{FT\_CI}_{(1)}^{Na}(k, fs, w) \\ \mathrm{FT\_CI}_{(2)}^{Na}(k, fs, w) \\ \vdots \\ \mathrm{FT\_CI}_{(Nt)}^{Na}(k, fs, w) \end{bmatrix} = \begin{bmatrix} h^1(k, fs, w) \\ h^2(k, fs, w) \\ \vdots \\ h^{Na}(k, fs, w) \end{bmatrix} \quad (4)$$

$$h^b(k, fs, w) = \begin{bmatrix} \mathrm{FT\_CI}_{(1)}^{b}(k, fs, w) \\ \mathrm{FT\_CI}_{(2)}^{b}(k, fs, w) \\ \vdots \\ \mathrm{FT\_CI}_{(Nt)}^{b}(k, fs, w) \end{bmatrix} \quad (5)$$

In the above, the processing at each component of the signal processor 207 has been described.

The direction estimator 214 calculates, for the virtual receiving array correlation vector h(k, fs, w) of the w-th Doppler frequency analyzer 213 output from the antenna system processors 201-1 to 201-Na, a virtual receiving array correlation vector $h_{\_after\_cal}(k, fs, w)$ obtained by correcting a phase deviation and an amplitude deviation between the antenna system processors 201 using an array correction value $h\_cal_{[y]}$. The virtual receiving array correlation vector $h_{\_after\_cal}(k, fs, w)$ is given by an expression below. Here, y=1, . . . , (Nt×Na).

$$h_{\_after\_cal}(k, fs, w) = CA\, h(k, fs, w) \quad (6)$$

$$CA = \begin{bmatrix} h\_cal_{[1]} & 0 & \cdots & 0 \\ 0 & h\_cal_{[2]} & \ddots & \vdots \\ \vdots & \ddots & \ddots & 0 \\ 0 & \cdots & 0 & h\_cal_{[Nt \times Na]} \end{bmatrix}$$

Then, using the virtual receiving array correlation vector $h_{\_after\_cal}(k, fs, w)$, the direction estimator 214 performs direction estimation processing of the horizontal direction and the vertical direction based on a phase difference of the reflected wave signals between the receiving antennas 202. The direction estimator 214 calculates a space profile by treating an azimuth direction θ and an elevation direction φ in a direction estimation evaluating function value P (θ, φ, k, fs, w) as variables in a predetermined angle range, extracts a predetermined number of local maximum peaks of the calculated space profile in descending order, and sets the azimuth and elevation directions of each local maximum peak as arrival direction estimation values.

Different kinds of the evaluating function value P(θ, φ, k, fs, w) are provided by different arrival direction estimation algorithms. For example, an estimation method using an array antenna disclosed in Cadzow, J. A., "Direction-of-arrival estimation using signal subspace modeling," Aerospace and Electronic Systems, IEEE Transactions on Volume: 28, Issue: 1, pp. 64-79, Publication Year: 1992.

For example, a beamformer method can be expressed in an expression below. Alternatively, the Capon and MUSIC methods are applicable as well.

$$P(\theta_u, \phi_v, k, fs, w) = |a(\theta_u, \phi_v)^H h_{\_after\_cal}(k, fs, w)|^2 \quad (7)$$

In this expression, a superscript H is the Hermite transposition operator, and $a(\theta_u, \phi_v)$ represents the directional vector of the virtual receiving array for arrival wave in an azimuth direction $\theta_u$ and an elevation direction $\phi_v$.

As described above, the direction estimator 214 outputs the w-th calculated arrival direction estimation value, the discrete time k, the Doppler frequency fsΔφ, and the angle $\theta_u$, as a radar positioning result.

The directional vector $a(\theta_u, \phi_v)$ is a (Nt×Na) column vector including an element as a complex response of the virtual receiving array when a reflected wave of the radar transmission signal arrives in the azimuth direction $\theta_u$ and the elevation direction $\phi_v$. The complex response $a(\theta_u, \phi_v)$ of the virtual receiving array represents a phase difference geometric-optically calculated depending on an element spacing between antennas.

$\theta_u$ takes values separated by a predetermined azimuth spacing $\beta_1$ in an azimuth range in which the arrival direction estimation is to be performed. For example, $\theta_u$ is set as described below.

$\theta_u = \theta\,\min + u\beta_1$ where $u = 0, \ldots, NU$ $NU = \mathrm{floor}[(\theta\,\max - \theta\,\min)/\beta_1] + 1$ In this expression, floor(x) is a function that returns a largest integer value not larger than a real number x.

$\varphi_v$ takes values separated by a predetermined elevation spacing $\beta_2$ in an elevation angle range in which the arrival direction estimation is to be performed. For example, $\varphi_v$ is set as described below.

$\varphi_v = \varphi$ min+$v\beta_2$ where $v = 0, \ldots, NV$ $NV = \text{floor}[(\varphi \text{ max} - \varphi \text{ min})/\beta_2] + 1$ The present embodiment assumes that the directional vector of the virtual receiving array is previously calculated based on a virtual receiving array arrangement VA #1, ..., VA #(Nt×Na) described later. Each element of the directional vector of the virtual receiving array indicates a phase difference geometric-optically calculated at the element spacing between antennas in the order of the virtual receiving array arrangement VA #1, ..., VA #(Nt×Na) to be described later.

The time information k described above may be converted into distance information for outputting. An expression below may be used to convert the time information k into distance information R(k). Here, Tw represents the code transmission slot, L represents the pulse code length, and $C_0$ represents the speed of light.

$$R(k) = k \frac{T_w C_0}{2L} \quad (8)$$

The Doppler frequency information (fs$\Delta\phi$) may be converted into a relative speed component for outputting. An expression below may be used to convert the Doppler frequency fs$\Delta\phi$ into a relative speed component vd(fs). Here, $\lambda$ represents the wavelength of the RF signal output from the transmission radio unit 107 at a carrier frequency.

$$v_d(f_s) = \frac{\lambda}{2} f_s \Delta\theta \quad (9)$$

[Antenna Arrangement in Radar Device 10]

Description will be made of an arrangement of the Nt transmitting antennas 106 and the Na receiving antennas 202 in the radar device 10 having the configuration described above.

Figure 6:
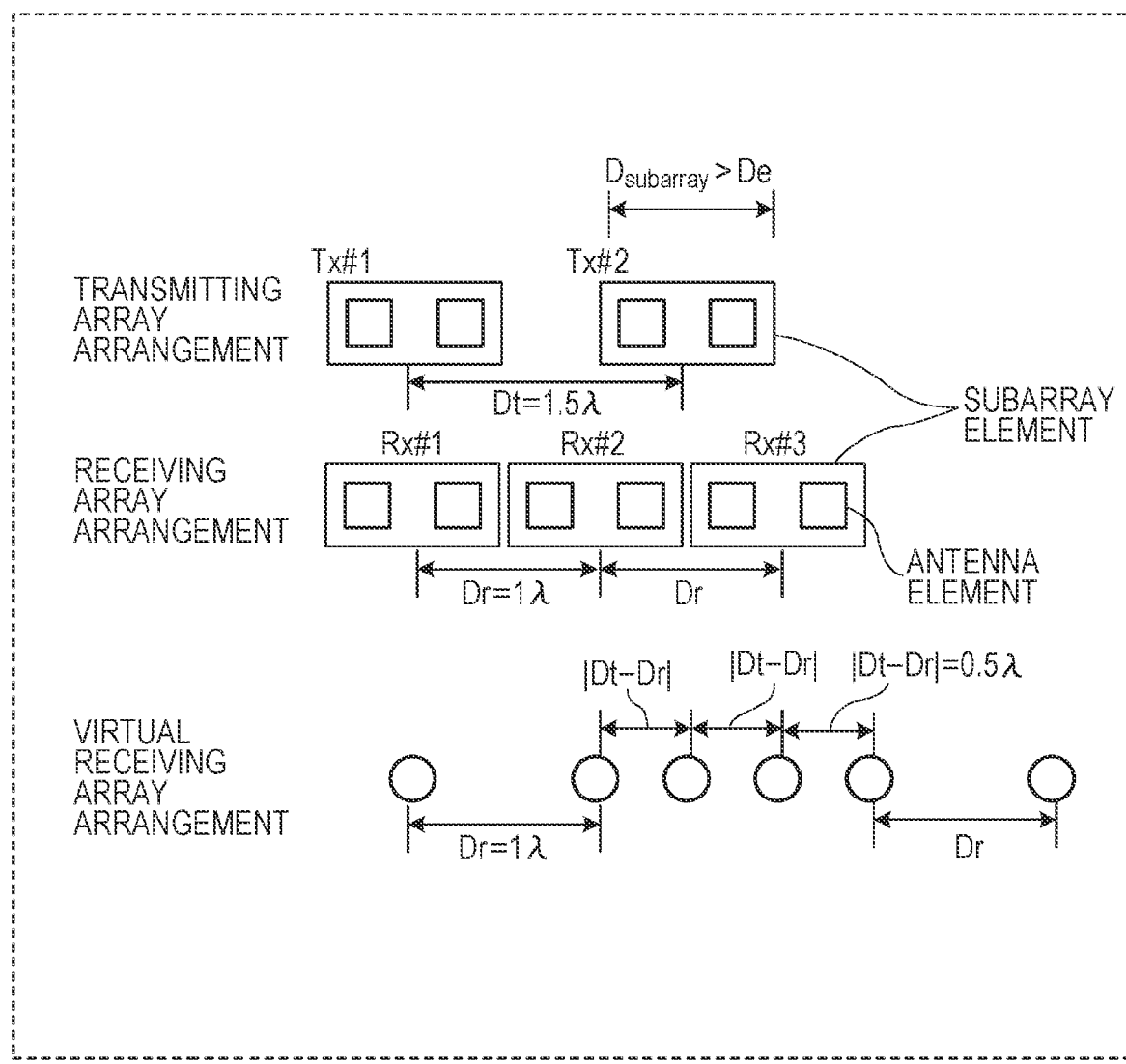
FIG. 6 illustrates antenna arrangements of a transmitting array, a receiving array, and a virtual receiving array according to the embodiment of the present disclosure.

FIG. 6 illustrates the antenna arrangement of a transmitting array including Nt=2 transmitting antennas 106 (Tx #1 and Tx #2), the antenna arrangement of a receiving array including Na=3 receiving antennas 202 (Rx #1, Rx #2, and Rx #3), and the antenna arrangement of a virtual receiving array (including Nt×Na=6 elements) configured in accordance with these transmitting and receiving array antennas.

Each of the transmitting antennas 106 and the receiving antennas 202 is a subarray element including two antenna elements.

$D_{subarray}$ represents the dimension (width) of the subarray element, and De represents a predetermined antenna element spacing with which no grating lobe is generated in a radar detection angle range. In FIG. 6, the dimension $D_{subarray}$ of the subarray element is larger than the predetermined antenna element spacing De ($D_{subarray}$>De). The predetermined antenna element spacing De is set to be equal to or larger than 0.5 wavelength and equal to or smaller than 0.75 wavelength.

Dt represents the subarray element spacing of the transmitting array antenna, and Dr represents the subarray element spacing of the receiving array antenna. For example, in FIG. 6, the subarray element spacing Dt of the transmitting array antenna is 1.5$\lambda$ (1.5 wavelength), and the subarray element spacing Dr of the receiving array antenna is 1$\lambda$ (1 wavelength). Thus, the subarray element spacings Dt and Dr are equal to or larger than 1 wavelength ($\lambda$) approximately.

In the present embodiment, the dimension $D_{subarray}$ of the subarray element is larger than the predetermined antenna element spacing De with which no grating lobe is generated in the radar detection angle range ($D_{subarray}$>De). In this case, the transmitting array and the receiving array are arranged such that the subarray element spacing Dt of the transmitting array antenna and the subarray element spacing Dr of the receiving array antenna satisfy a relation expressed in an expression below.

$|Dt - Dr| = De \quad (10)$

In other words, the absolute value of the difference between the subarray element spacing Dt of the transmitting array antenna and the subarray element spacing Dr of the receiving array antenna is equal to the predetermined antenna element spacing De.

FIG. 6 illustrates an example case in which De is $\lambda/2$, the subarray element spacing Dt of the transmitting array antenna is 1.5$\lambda$, and the subarray element spacing Dr of the receiving array antenna is $\lambda$.

In this case, as illustrated in FIG. 6, the element spacing in a central part (other than edges) of the virtual receiving array is equal to the predetermined antenna element spacing De (=|Dt−Dr|=$\lambda/2$). In other words, the virtual receiving array has an array arrangement with which no grating lobe is generated in the radar detection angle range.

Figure 7:
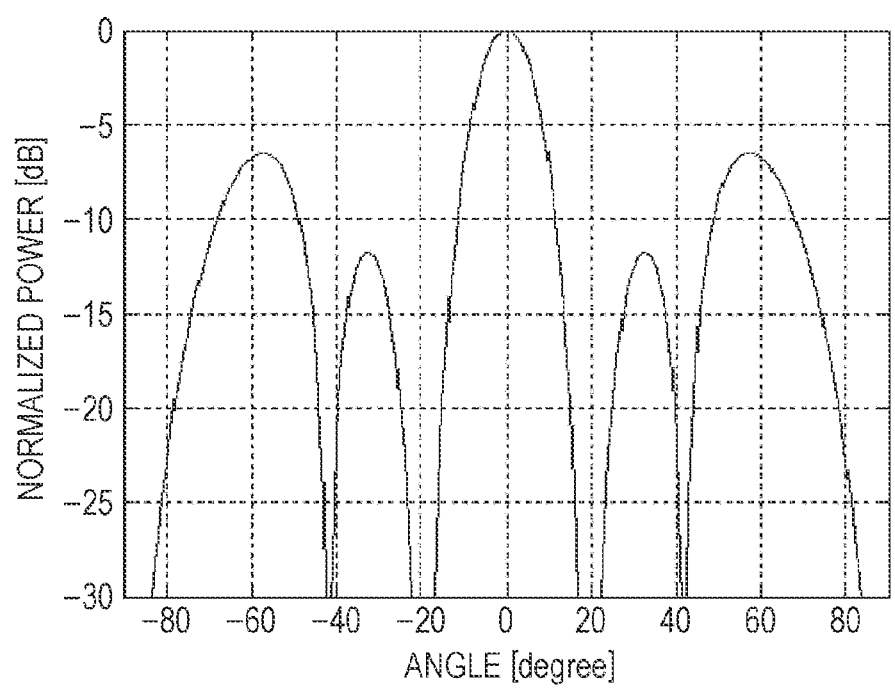
FIG. 7 illustrates a directivity pattern according to the embodiment of the present disclosure.

FIG. 7 illustrates a directivity pattern (Fourier beam pattern with the main beam at the direction of 0°) in the transmitting and receiving array antenna arrangements (with De=0.5$\lambda$, Dt=1.5$\lambda$, and Dr=$\lambda$) illustrated in FIG. 6. As illustrated in FIG. 7, no grating lobe is generated in an angle range of ±90° of the main beam direction.

As described above, in the present embodiment, the transmitting antennas 106 and the receiving antennas 202 are arranged such that the difference (absolute value) between the element spacing of the transmitting array antenna including the transmitting antennas 106 and the element spacing of the receiving array antenna including the receiving antennas 202 is equal to the predetermined element spacing with which no grating lobe is generated.

In this manner, the element spacing of the virtual receiving array configured in accordance with the arrangement relation between the transmitting antennas 106 and the receiving antennas 202 can be set to the predetermined element spacing with which no grating lobe is generated. This can prevent generation of a false detection due to any grating lobe when the direction estimation processing is performed at the direction estimator 214.

Thus, the present embodiment can prevent generation of an unnecessary grating lobe, thereby achieving a desired directivity pattern, even when array elements having a subarray configuration are arranged.

FIG. 6 illustrates an exemplary configuration in which each array antenna has a linear arrangement in the horizontal direction so as to perform the arrival direction estimation in the horizontal direction. However, in the present embodiment, even when the array antenna has a linear arrangement in the vertical direction, the virtual receiving array having the predetermined element spacing with which no grating lobe is generated can be arranged in the vertical direction as well so as to perform the arrival direction estimation in the vertical direction.

[Variation 1]

Variation 1 describes an example in which the arrival direction estimation is performed in both of the horizontal and vertical directions.

Transmitting array elements and receiving array elements are two-dimensionally arranged in the vertical and horizontal directions.

Figure 8:
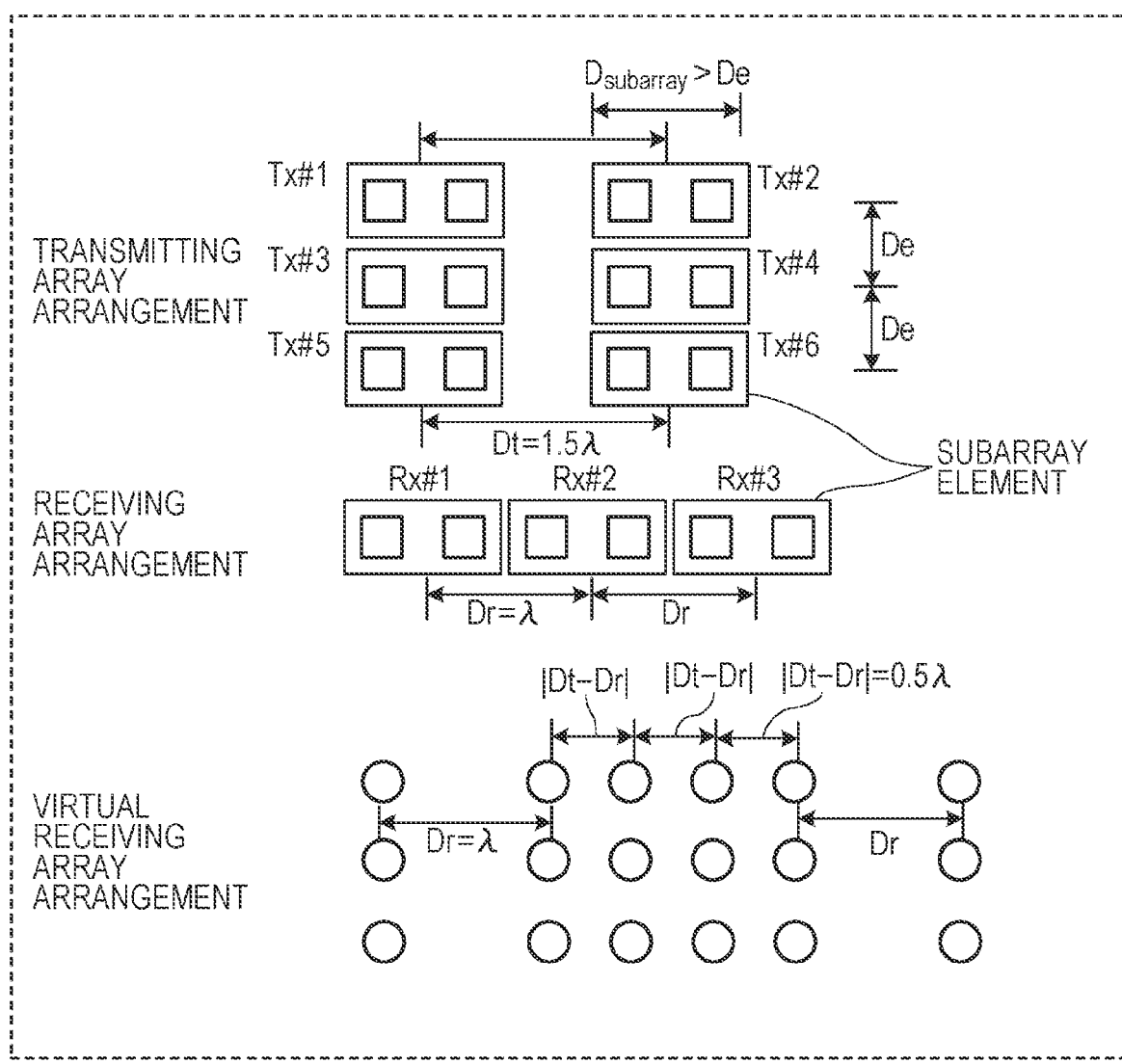
FIG. 8 illustrates antenna arrangements of a transmitting array, a receiving array, and a virtual receiving array according to Variation 1 of the embodiment of the present disclosure.

FIG. 8 illustrates the antenna arrangement of a transmitting array including Nt=6 transmitting antennas 106 (Tx #1 to Tx #6), the antenna arrangement of a receiving array including Na=3 receiving antennas 202 (Rx #1, Rx #2, and Rx #3), and the antenna arrangement of a virtual receiving array (including Nt×Na=18 elements) configured in accordance with these transmitting and receiving array antennas.

In FIG. 8, the transmitting array has a two-dimensional arrangement of two subarray elements in the horizontal direction and three subarray elements in the vertical direction.

In FIG. 8, the horizontal dimension of each subarray element is equal to $D_{subarray}$, and the vertical dimension is equal to or smaller than De. In other words, the horizontal dimension of each antenna element is larger than the predetermined antenna element spacing De and the vertical dimension is equal to or smaller than the predetermined antenna element spacing De.

FIG. 8 illustrates an example in which the predetermined antenna element spacing De is $\lambda/2$, the subarray element spacing Dt of the transmitting array antenna in the horizontal direction is $1.5\lambda$, and the element spacing of the transmitting array antenna in the vertical direction is De. The subarray element spacing Dr of the receiving array antenna in the horizontal direction is $\lambda$.

In this case, as illustrated in FIG. 8, the absolute value of the difference between the subarray element spacing Dt of the transmitting array antenna and the subarray element spacing Dr of the receiving array antenna is equal to the predetermined antenna element spacing De in the horizontal direction. As illustrated in FIG. 8, the element spacing of the transmitting array antenna is equal to the predetermined antenna element spacing De in the vertical direction.

Accordingly, as illustrated in FIG. 8, the element spacing of the central part (other than edges) of the virtual receiving array is equal to the predetermined antenna element spacing De (=|Dt−Dr|=$\lambda/2$) in the horizontal direction.

As illustrated in FIG. 8, the element spacing of the virtual receiving array is equal to the predetermined antenna element spacing De in the vertical direction like the element spacing of the transmitting array in the vertical direction.

In other words, the virtual receiving array has an array arrangement with which no grating lobe is generated in the radar detection angle range both in the horizontal and vertical directions.

As expressed in an expression below, for the arrival direction estimation in the horizontal and vertical directions, the direction estimator 214 calculates the direction estimation evaluating function value P($\theta_u$, $\varphi_v$, k, fs, w) by treating the azimuth direction $\theta_u$ and the elevation direction $\varphi_v$ as variables, and sets the azimuth and elevation directions at which the maximum value of the direction estimation evaluating function value is obtained, as an arrival direction estimation value DOA(k,fs,w).

$$DOA(k, fs, w) = \arg\max_{\theta_u, \phi_v} P(\theta_u, \phi_v, k, fs, w) \quad (11)$$

In this expression, u=1, ..., NU. The arg max P(x) is an operator that outputs a domain value at which the function value P(x) is at maximum.

Different kinds of the evaluating function value P($\theta_u$, $\varphi_v$, k, fs, w) are provided by different arrival direction estimation algorithms. For example, an estimation method using an array antenna disclosed in Cadzow described above may be used. For example, the beamformer method can be expressed in an expression below. Alternatively, the Capon and MUSIC methods are applicable as well.

$$P(\theta_u,\phi_v,k,fs,w)=a(\theta_u,\phi_v)^H H_{\_after\_cal}(k,fs,w)a(\theta_u,\phi_v) \quad (12)$$

In this expression, a superscript H is the Hermite transposition operator, and a($\theta_u$, $\varphi_v$) represents the directional vector for arrival wave in the azimuth direction $\theta_u$ and the elevation direction $\varphi_v$.

Figure 9A:
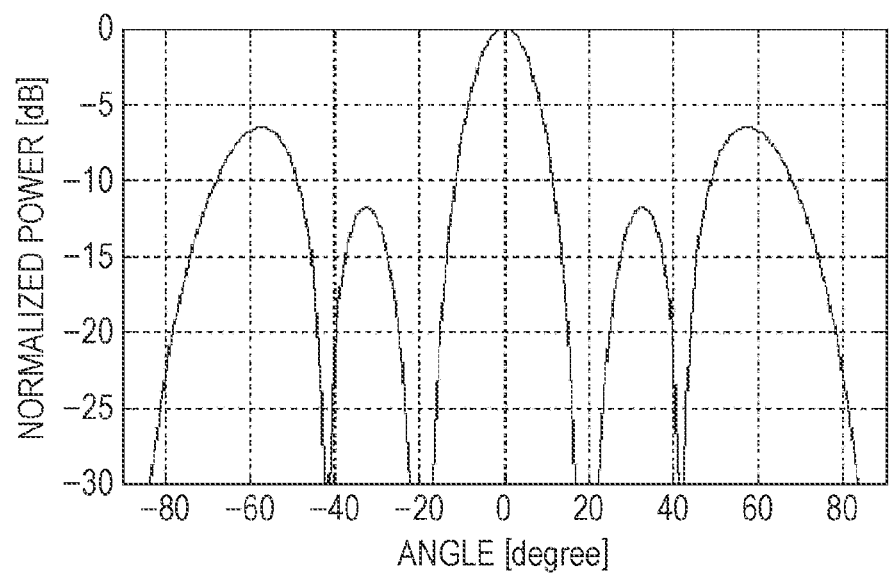
FIG. 9A illustrates a directivity pattern in the horizontal direction according to Variation 1 of the embodiment of the present disclosure.
Figure 9B:
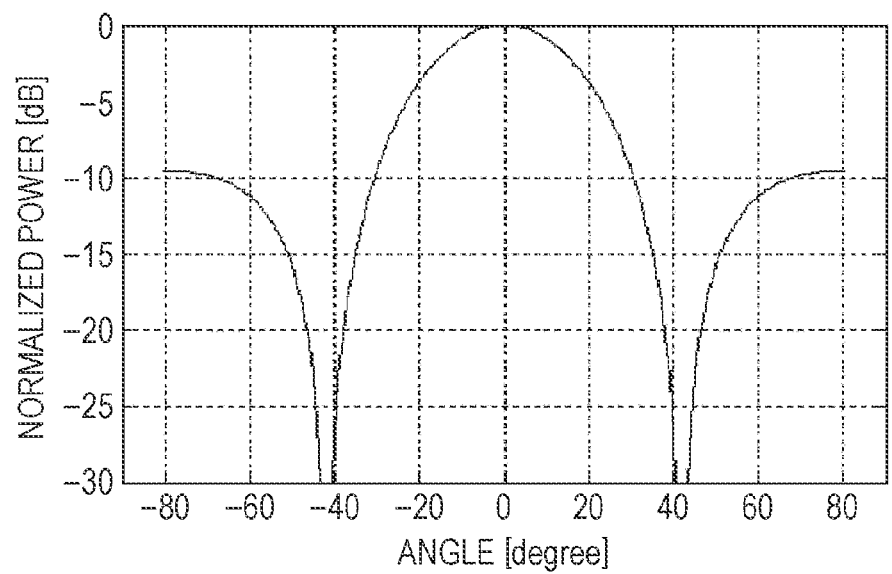
FIG. 9B illustrates a directivity pattern in the vertical direction according to Variation 1 of the embodiment of the present disclosure.

FIGS. 9A and 9B illustrate directivity patterns (Fourier beam patterns with the main beam at the direction of 0°) of the transmitting and receiving array antenna arrangements (with De=0.5$\lambda$, Dt=1.5$\lambda$, and Dr=1$\lambda$) illustrated in FIG. 8 in the horizontal and vertical directions, respectively.

As illustrated in FIG. 9A, no grating lobe is generated in the angle range of ±90° of the main beam direction in the horizontal direction. In addition, as illustrated in FIG. 9B, a beam pattern in which no grating lobe is generated is formed in the vertical direction.

Use of such arrangements of the transmitting and receiving array antennas can prevent generation of a false detection due to any grating lobe in both of the horizontal and vertical directions when the direction estimation processing is performed at the direction estimator 214.

Thus, Variation 1 can prevent generation of an unnecessary grating lobe, thereby achieving a desired directivity pattern, even when array elements having a subarray configuration are two-dimensionally arranged.

Although FIG. 8 illustrates the case in which the dimension of the subarray element in the horizontal direction is $D_{subarray}$ (>De), Variation 1 is also applicable when the dimension of the subarray element in the vertical direction is $D_{subarray}$ (>De). In this case, the transmitting array may be arranged in the vertical direction such that the difference (absolute value) between the element spacing of the transmitting array antenna and the element spacing of the receiving array antenna is equal to the predetermined element spacing with which no grating lobe is generated.

[Variation 2]

Variation 2 describes another example in which the arrival direction estimation is performed in both of the horizontal and vertical directions.

Specifically, when the transmitting array antenna has an element spacing equal to Dt (>De) in the horizontal direction and an element spacing equal to the predetermined antenna element spacing De in the vertical direction, in the transmitting array antenna, arrays adjacent to each other in the vertical direction, each array having two subarray elements linearly arranged in the horizontal direction, are shifted from each other in the horizontal direction by the predetermined antenna element spacing De.

Figure 10:
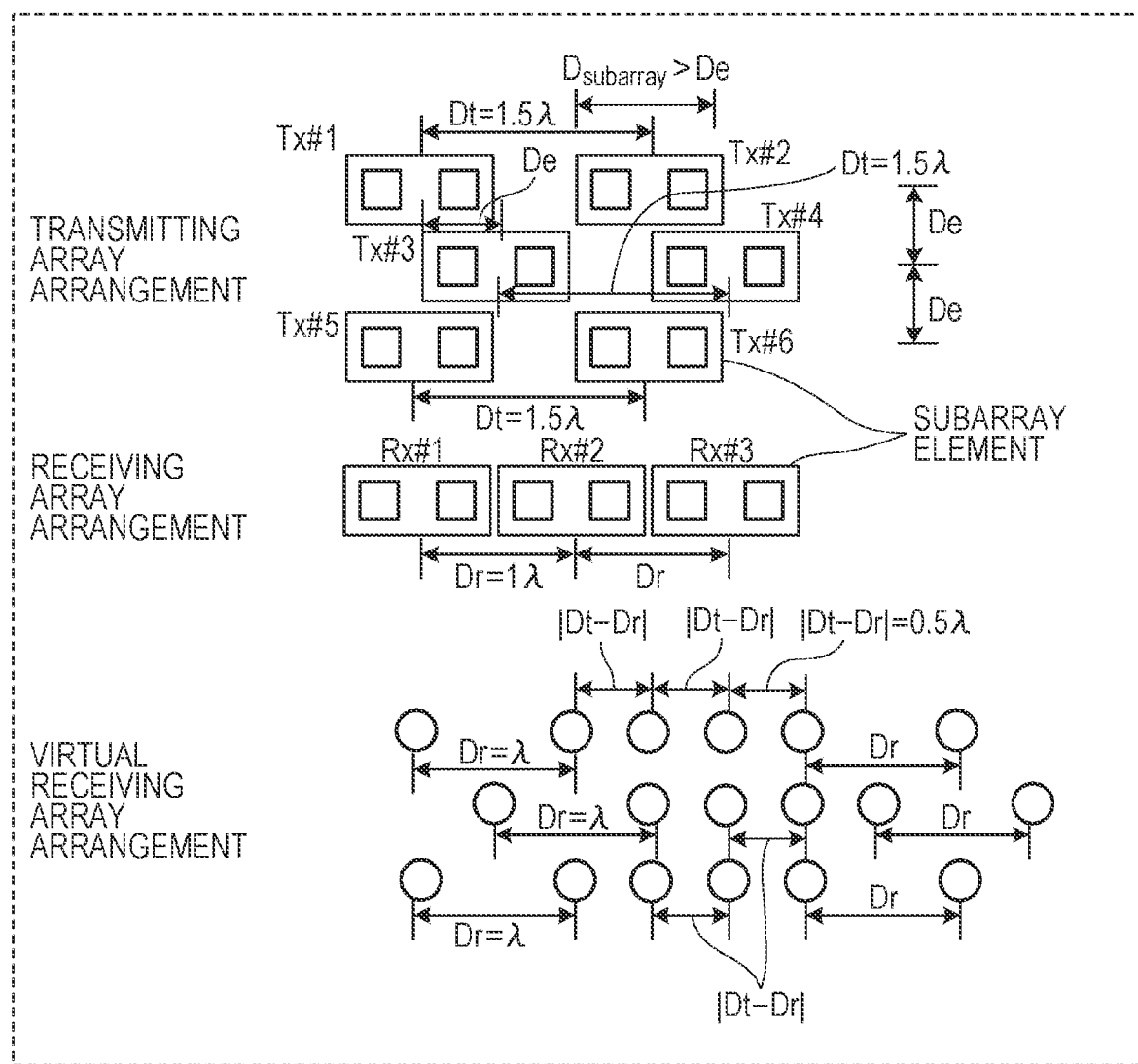
FIG. 10 illustrates antenna arrangements of a transmitting array, a receiving array, and a virtual receiving array according to Variation 2 of the embodiment of the present disclosure.

FIG. 10 illustrates the antenna arrangement of a transmitting array including Nt=6 transmitting antennas 106 (Tx #1 to Tx #6), the antenna arrangement of a receiving array including Na=3 receiving antennas 202 (Rx #1, Rx #2, and Rx #3), and the antenna arrangement of a virtual receiving array (including Nt×Na=18 elements) configured in accordance with these transmitting and receiving array antennas.

In FIG. 10, the transmitting array has a two-dimensional arrangement of two subarray elements in the horizontal direction and three subarray elements in the vertical direction.

In FIG. 10, the dimension of the subarray element in the horizontal direction is equal to $D_{subarray}$, and the dimension of the subarray element in the vertical direction is equal to or smaller than De. In other words, the dimension of each antenna element is larger than the predetermined antenna element spacing De in the horizontal direction and equal to or smaller than the predetermined antenna element spacing De in the vertical direction.

In FIG. 10, similarly to FIG. 8, the predetermined antenna element spacing De is $\lambda/2$, the subarray element spacing Dt of the transmitting array antenna in the horizontal direction is $1.5\lambda$, and the element spacing of the transmitting array antenna in the vertical direction is De. The subarray element spacing Dr of the receiving array antenna in the horizontal direction is $\lambda$.

Similarly to Variation 1 (FIG. 8), as illustrated in FIG. 10, the absolute value of the difference between the subarray element spacing Dt of the transmitting array antenna and the subarray element spacing Dr of the receiving array antenna is equal to the predetermined antenna element spacing De in the horizontal direction. As illustrated in FIG. 10, the element spacing of the transmitting array antenna is equal to the predetermined antenna element spacing De in the vertical direction.

In FIG. 10, the transmitting antennas 106 disposed away from each other by the antenna element spacing De in the vertical direction of the transmitting array antenna (the transmitting antennas 106 adjacent to each other in the vertical direction) are shifted from each other in the horizontal direction by the antenna element spacing De. In other words, in the transmitting array antenna, the arrays adjacent to each other in the vertical direction, each array having two subarray elements linearly arranged in the horizontal direction, are shifted from each other in the horizontal direction by the predetermined element spacing.

For example, in FIG. 10, the array (in other words, a subarray element array) of the transmitting antennas Tx #1 and Tx #2 and the array of the transmitting antennas Tx #3 and Tx #4 adjacent to the array of the transmitting antennas Tx #1 and Tx #2 in the vertical direction are shifted from each other by the antenna element spacing De. Similarly, the array of the transmitting antennas Tx #3 and Tx #4 and the array of the transmitting antennas Tx #5 and Tx #6 adjacent to the array of the transmitting antennas Tx #3 and Tx #4 in the vertical direction are shifted from each other in the horizontal direction by the antenna element spacing De.

In FIG. 10, the element spacing of the central part (other than edges) of the virtual receiving array is equal to the predetermined antenna element spacing De ($=|Dt-Dr|=\lambda/2$) in the horizontal direction. As illustrated in FIG. 10, similarly to the element spacing of the transmitting array in the vertical direction, the element spacing of the virtual receiving array is equal to the predetermined antenna element spacing De in the vertical direction. In other words, the virtual receiving array has an array arrangement with which no grating lobe is generated in the radar detection angle range.

As illustrated in FIG. 10, the array of array elements in the central part (second row) of the virtual receiving array in the vertical direction is shifted from the other arrays of array elements (first and third rows) by De in the horizontal direction. Accordingly, in FIG. 10, the antenna elements are arranged on a two-dimensional plane on which the virtual receiving array is arranged, at a narrower spacing than that of Variation 1 (FIG. 8). This allows the virtual receiving array to achieve a reduced sidelobe level.

Figure 11A:
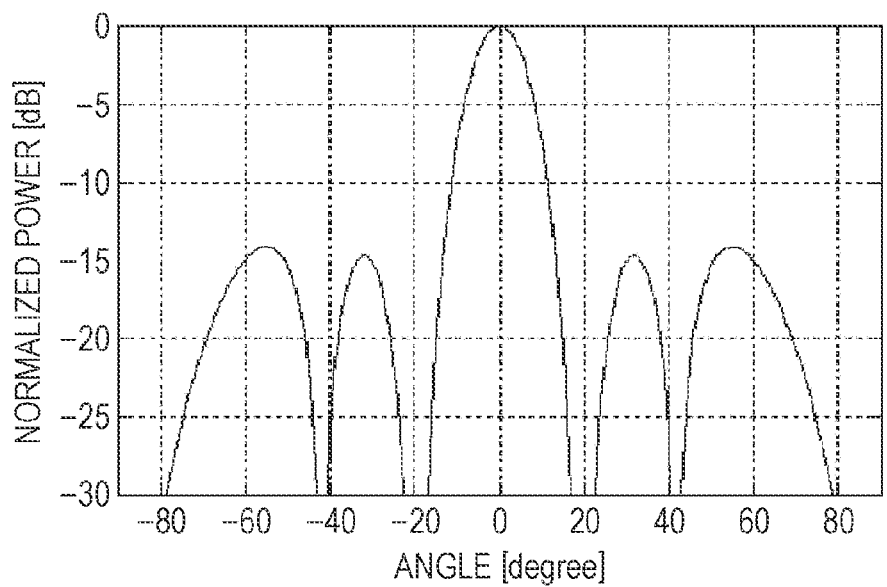
FIG. 11A illustrates a directivity pattern in the horizontal direction according to Variation 2 of the embodiment of the present disclosure.
Figure 11B:
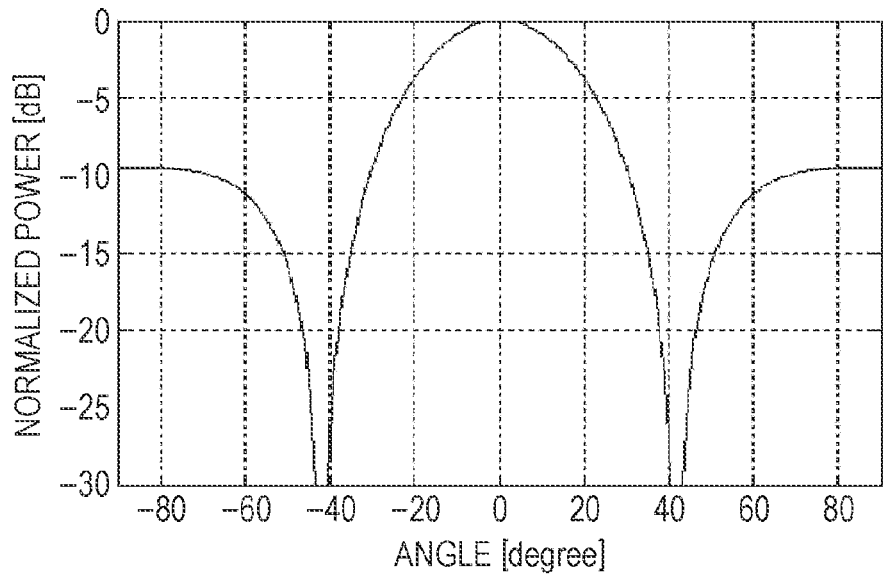
FIG. 11B illustrates a directivity pattern in the vertical direction according to Variation 2 of the embodiment of the present disclosure.

FIGS. 11A and 11B illustrate directivity patterns (Fourier beam patterns with the main beam at the direction of 0°) of the transmitting and receiving array antenna arrangements (with De=$0.5\lambda$, Dt=$1.5\lambda$, and Dr=$\lambda$) illustrated in FIG. 10 in the horizontal and vertical directions, respectively.

As illustrated in FIG. 11A, no grating lobe is generated in the angle range of ±90° of the main beam direction in the horizontal direction. In addition, as illustrated in FIG. 11B, a beam pattern in which no grating lobe is generated is formed in the vertical direction.

Moreover, as illustrated in FIG. 11A, the directivity pattern in the horizontal direction has reduced sidelobe levels as compared to those of Variation 1 (FIG. 9A).

Use of such arrangements of the transmitting and receiving array antennas can prevent generation of a false detection due to a grating lobe and a sidelobe in both of the horizontal and vertical directions when the direction estimation processing is performed at the direction estimator 214.

Thus, Variation 2 can prevent generation of an unnecessary grating lobe and achieve a reduced sidelobe level, thereby achieving a desired directivity pattern, even when array elements having a subarray configuration are two-dimensionally arranged.

[Variation 3]

Variation 3 describes another example in which the arrival direction estimation is performed in both of the horizontal and vertical directions.

Specifically, in the transmitting array antenna, arrays adjacent to each other in the vertical direction, each array having subarray elements linearly arranged in the horizontal direction, are arranged in the vertical direction at a spacing equal to the product of the predetermined antenna element spacing De and a constant $\alpha$, and the arrays adjacent to each other in the vertical direction, each array having two subarray elements linearly arranged in the horizontal direction, are shifted from each other in the horizontal direction by a spacing equal to the product of the predetermined antenna element spacing De and a constant $\beta$.

Figure 12:
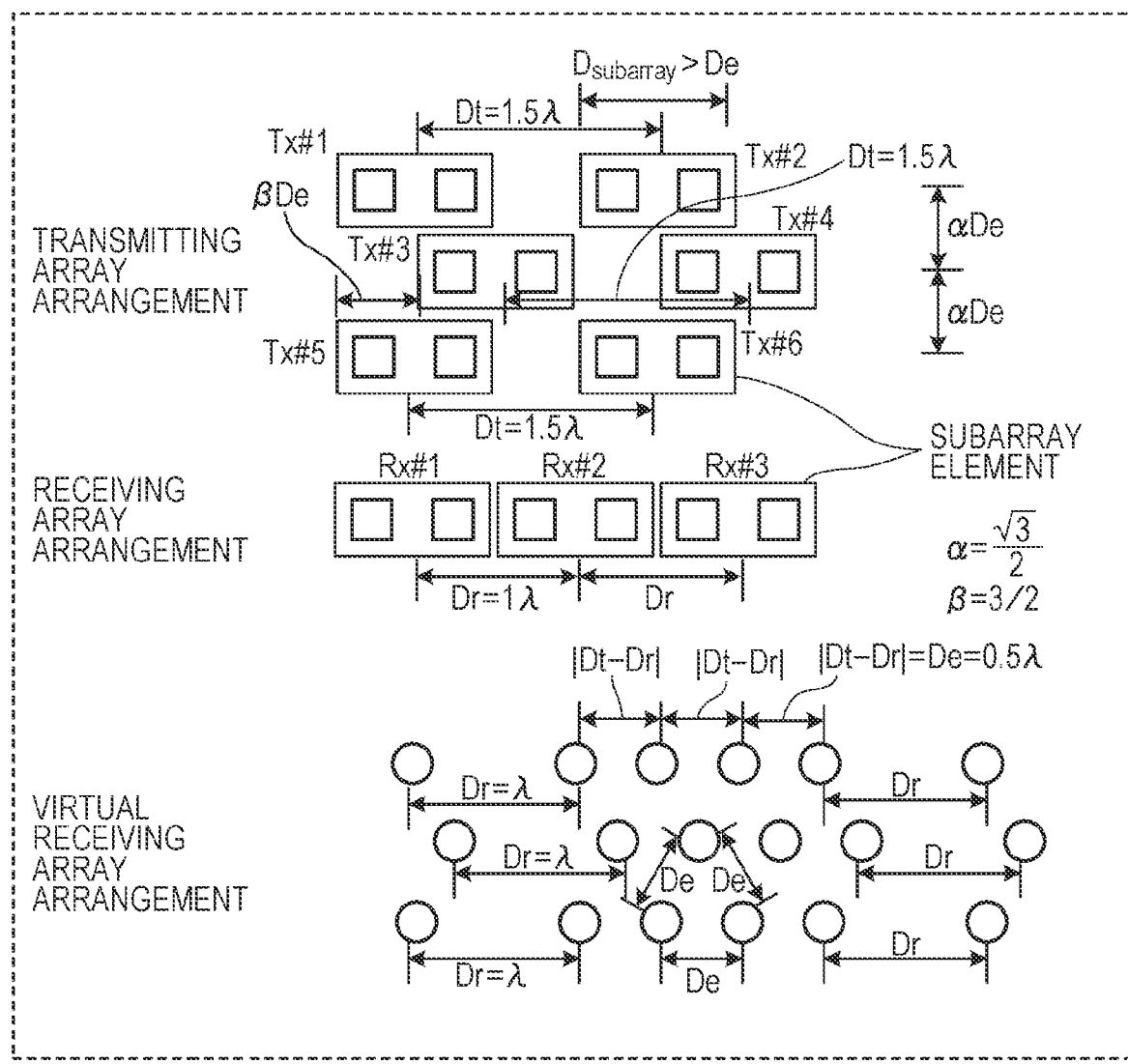
FIG. 12 illustrates antenna arrangements of a transmitting array, a receiving array, and a virtual receiving array according to Variation 3 of the embodiment of the present disclosure.

FIG. 12 illustrates the antenna arrangement of a transmitting array including Nt=6 transmitting antennas 106 (Tx #1 to Tx #6), the antenna arrangement of a receiving array including Na=3 receiving antennas 202 (Rx #1, Rx #2, and Rx #3), and the antenna arrangement of a virtual receiving array (including Nt×Na=18 elements) configured in accordance with these transmitting and receiving array antennas.

In FIG. 12, the transmitting array has a two-dimensional arrangement of two subarray elements in the horizontal direction and three subarray elements in the vertical direction.

In FIG. 12, the dimension of the subarray element in the horizontal direction is equal to $D_{subarray}$, and the dimension of the subarray element in the vertical direction is equal to or smaller than De. In other words, the dimension of each antenna element is larger than the predetermined antenna element spacing De in the horizontal direction and equal to or smaller than the predetermined antenna element spacing De in the vertical direction.

In FIG. 12, similarly to FIG. 8, the predetermined antenna element spacing De is $\lambda/2$, the subarray element spacing Dt of the transmitting array antenna in the horizontal direction is $1.5\lambda$, and the subarray element spacing Dr of the receiving array antenna in the horizontal direction is λ. The subarray element spacing Dr of the receiving array antenna in the horizontal direction is λ.

Similarly to Variations 1 and 2 (FIGS. 8 and 10), as illustrated in FIG. 12, the absolute value of the difference between the subarray element spacing Dt of the transmitting array antenna and the subarray element spacing Dr of the receiving array antenna is equal to the predetermined antenna element spacing De in the horizontal direction.

As illustrated in FIG. 12, the element spacing of the transmitting array antenna in the vertical direction is a spacing αDe as the product of the predetermined antenna element spacing De and the constant α.

In FIG. 12, the transmitting antennas 106 disposed away from each other by the element spacing αDe in the vertical direction of the transmitting array antenna (the transmitting antennas 106 adjacent to each other in the vertical direction) are shifted from each other in the horizontal direction by a spacing βDe as the product of the predetermined antenna element spacing De and the constant β. In other words, in the transmitting array antenna, the arrays adjacent to each other in the vertical direction, each array having the two subarray elements linearly arranged in the horizontal direction, are shifted from each other in the horizontal direction by a spacing β times larger than the predetermined element spacing.

For example, in FIG. 12, the array of the transmitting antennas Tx #1 and Tx #2 and the array of the transmitting antennas Tx #3 and Tx #4 adjacent to the array of the transmitting antennas Tx #1 and Tx #2 in the vertical direction are shifted from each other by the spacing βDe. Similarly, the array of the transmitting antennas Tx #3 and Tx #4 and the array of the transmitting antennas Tx #5 and Tx #6 adjacent to the array of the transmitting antennas Tx #3 and Tx #4 in the vertical direction are shifted from each other in the horizontal direction by the spacing βDe.

For example, $\alpha=(3)^{0.5}/2 \approx 0.866$, and $\beta=0.5$.

In FIG. 12, the element spacing of the central part (other than edges) of the virtual receiving array is equal to the predetermined antenna element spacing De (=|Dt−Dr|=λ/2) in the horizontal direction.

As illustrated in FIG. 12, similarly to the element spacing of the transmitting array in the vertical direction, the element spacing of the virtual receiving array in the vertical direction is $\alpha De$ (=$(3)^{0.5}$ De).

In other words, the virtual receiving array has an array arrangement with which no grating lobe is generated in the radar detection angle range.

As illustrated in FIG. 12, the array of array elements in the central part (second row) of the virtual receiving array in the vertical direction is shifted from the other arrays of array elements (first and third rows) by βDe (=0.5De) in the horizontal direction.

Accordingly, in FIG. 12, similarly to Variation 2 (FIG. 10), antenna elements are arranged on the two-dimensional plane on which the virtual receiving array is arranged, at a narrower spacing than that of Variation 1 (FIG. 8). This allows the virtual receiving array to achieve a reduced sidelobe level.

As illustrated in FIG. 12, each distance between three antenna elements in the central part of the virtual receiving array adjacent to each other on the two-dimensional plane on which the virtual receiving array is arranged is the predetermined antenna element spacing De. In other words, straight lines connecting three array elements adjacent to each other on the two-dimensional plane on which the virtual receiving array is arranged form an equilateral triangle having all three sides equal to the antenna element spacing De. This equilateral triangle lattice arrangement provides a high grating lobe preventing performance as compared to that provided by a rectangular lattice arrangement for the same opening length. Thus, Variation 3 can further prevent generation of a grating lobe and achieve a further reduced sidelobe level as compared to Variation 2.

To do so, the constants α and β need to be set such that three array elements adjacent to each other in two dimensions of the vertical and horizontal directions are arranged at the predetermined antenna element spacing De (in an equilateral triangle having all three sides equal to De).

Figure 13A:
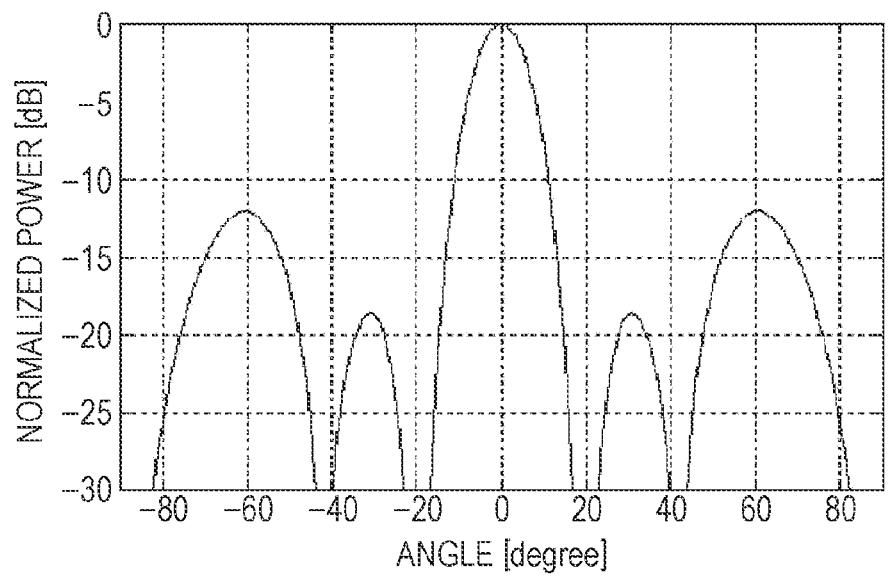
FIG. 13A illustrates a directivity pattern in the horizontal direction according to Variation 3 of the embodiment of the present disclosure.
Figure 13B:
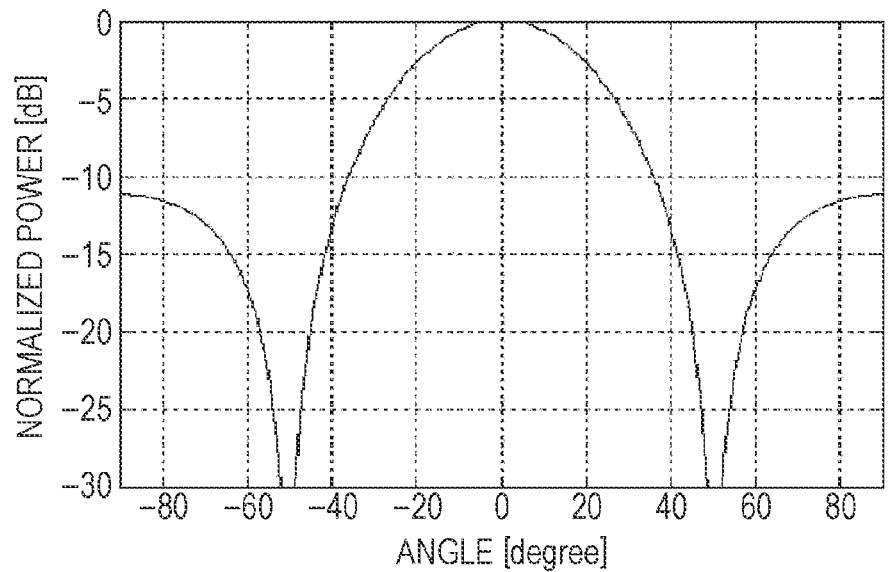
FIG. 13B illustrates a directivity pattern in the vertical direction according to Variation 3 of the embodiment of the present disclosure.

FIGS. 13A and 13B illustrate directivity patterns (Fourier beam patterns with the main beam at the direction of 0°) of the transmitting and receiving array antenna arrangements (with De=0.5λ, Dt=1.5λ, Dr=1λ, $\alpha=(3)^{0.5}/2$, and $\beta=0.5$) illustrated in FIG. 12 in the horizontal and vertical directions, respectively.

As illustrated in FIG. 13A, no grating lobe is generated in the angle range of ±90° of the main beam direction in the horizontal direction. In addition, as illustrated in FIG. 13B, a beam pattern in which no grating lobe is generated is formed in the vertical direction, too.

Moreover, as illustrated in FIG. 13A, the directivity pattern in the horizontal direction has reduced sidelobe levels as compared to those of Variation 1 (FIG. 9A).

FIG. 13A also shows that sidelobe levels appearing in the direction closest to the main lobe (the direction of ±30° in FIG. 13A) in the directivity pattern of the horizontal direction are reduced in comparison with Variation 2 (FIG. 11A).

Use of such arrangements of the transmitting and receiving array antennas can prevent generation of a false detection due to a grating lobe and a sidelobe in both of the horizontal and vertical directions when the direction estimation processing is performed at the direction estimator 214.

Thus, Variation 3 can prevent generation of an unnecessary grating lobe and achieve a reduced sidelobe level even when array elements having a subarray configuration are two-dimensionally arranged, thereby achieving a desired directivity pattern.

The above has described the embodiment according to an aspect of the present disclosure.

The operations according to the embodiments and variations may be performed in combination as appropriate.

The embodiment above describes the example in which the number Nt of the transmitting antennas 106 is two or three, and the number Na of the receiving antennas 202 is three. However, the number Nt of the transmitting antennas 106 and the number Na of the receiving antennas 202 are not limited to these numbers.

Although the embodiment above describes the case in which the transmitting antennas 106 and the receiving antennas 202 are each a subarray element including two antenna elements, the transmitting antennas 106 and the receiving antennas 202 may each include three antenna elements or more.

Variations 1 to 3 of the embodiment above each describe the case in which the transmitting array antenna has a two-dimensional arrangement in the horizontal and vertical directions, and the receiving array antenna has a one-dimensional arrangement in the horizontal direction. However, in the present disclosure, the receiving array antenna may have a two-dimensional arrangement, and the transmitting array antenna may have a one-dimensional arrangement. In this case, the above-described arrangement of subarray elements in the transmitting array antenna may be applied to the arrangement of subarray elements in the receiving array antenna.

The embodiment above describe the case in which the dimension of each antenna element is larger than the predetermined antenna element spacing De in the horizontal direction and equal to or smaller than the predetermined antenna element spacing De in the vertical direction. However, the vertical dimension of the antenna element may be larger than the predetermined antenna element spacing De and the horizontal dimension may be equal to or smaller than the predetermined antenna element spacing De. In this case, the above-described arrangements of subarray elements in the transmitting and receiving array antennas may be exchanged between the horizontal direction and the vertical direction.

Although the embodiments describes a case of using a coded pulse radar, the present disclosure is also applicable to a radar type such as a chirp pulse radar using frequency-modulated pulsed waves.

In the radar device 10 illustrated in FIG. 2, the radar transmitter 100 and the radar receiver 200 may be individually arranged at physically separated locations.

The above description is made on the radar device having a configuration in which the radar transmitter sends out different transmission signals provided with code division multiplexing through multiple transmitting antennas, and then the radar receiver separates the transmission signals to perform reception processing thereon. However, the configuration of the radar device is not limited thereto, and may be such that the radar transmitter sends out different transmission signals provided with frequency division multiplexing through multiple transmitting antennas, and then the radar receiver separates the transmission signals to perform reception processing thereon. Alternatively, the radar device may have a configuration in which the radar transmitter sends out different transmission signals provided with time division multiplexing through multiple transmitting antennas, and then the radar receiver performs reception processing on the transmission signals. These configurations provide the same effect as that of the embodiment above.

The radar device 10 includes, although not illustrated, a central processing unit (CPU), a storage medium such as a read only memory (ROM) storing a control program, and, and a working memory such as a random access memory (RAM). With this configuration, the function of each component described above is achieved through execution of the control program by the CPU. The hardware configuration of the radar device 10 is, however, not limited thereto. For example, each functional component of the radar device 10 may be achieved as an integrated circuit (IC). The functional components may be provided as individual chips, or part or all thereof may be included in a single chip.

SUMMARY OF THE PRESENT DISCLOSURE

A radar device according to the present disclosure includes: radar transmission circuitry which, in operation, transmits a radar signal through a transmitting array antenna at a predetermined transmission period; and radar reception circuitry which, in operation, receives a reflected wave signal which is the radar signal reflected by an object through a receiving array antenna. The transmitting array antenna and the receiving array antenna each include multiple subarray elements. The subarray elements are linearly arranged in a first direction in each of the transmitting array antenna and the receiving array antenna. Each subarray element includes multiple antenna elements. A dimension of each subarray element in the first direction is larger than a predetermined antenna element spacing. An absolute value of a difference between a subarray element spacing of the transmitting array antenna and a subarray element spacing of the receiving array antenna is equal to the predetermined antenna element spacing.

In the radar device according to the present disclosure, the predetermined antenna element spacing is equal to or larger than 0.5 wavelength and equal to or smaller than 0.75 wavelength.

In the radar device according to the present disclosure, the subarray elements in one of the transmitting array antenna and the receiving array antenna are further arranged in a second direction orthogonal to the first direction. The dimension of each subarray element in the first direction is larger than the predetermined antenna element spacing, the absolute value of the difference between the subarray element spacing of the transmitting array antenna in the first direction and the subarray element spacing of the receiving array antenna in the first direction is equal to the predetermined antenna element spacing, the dimension of the subarray element in the second direction is not larger than the predetermined antenna element spacing, and the subarray elements are arranged in the second direction at the predetermined antenna element spacing.

In the radar device according to the present disclosure, the subarray elements arranged in the second direction are shifted from each other in the first direction by the predetermined antenna element spacing.

In the radar device according to the present disclosure, the subarray elements in one of the transmitting array antenna and the receiving array antenna are further arranged in the second direction orthogonal to the first direction. The dimension of each subarray element in the first direction is larger than the predetermined antenna element spacing, the absolute value of the difference between the subarray element spacing of the transmitting array antenna in the first direction and the subarray element spacing of the receiving array antenna in the first direction is equal to the predetermined antenna element spacing in the first direction, the subarray elements are arranged in the second direction at a spacing $((\sqrt{3})/2)$ times larger than the predetermined antenna element spacing, and the subarray elements adjacent to each other in the second direction are shifted from each other in the first direction by a spacing ($\frac{1}{2}$) times larger than the predetermined antenna element spacing.

While the various embodiments (variations) have been described above with reference to the drawings, it is to be understood that the present disclosure is not limited to the disclosed exemplary embodiments. It is clear that the skilled person in the art could think of various modifications or corrections within the scope of the claims, which are understood to belong to the technical range of the present disclosure. The components described in the embodiments (variations) may be optionally combined without departing from the spirit of the disclosure.

The present disclosure has an exemplary configuration using hardware in the embodiments described above, but is achievable with software in combination with hardware.

Each functional block used in the description of the embodiments is typically achieved as an LSI, which is an integrated circuit. The integrated circuit may control the functional block used in the description of the embodiments, and include an input and an output. These integrated circuits may be provided as individual chips, or part or all thereof may be included in a single chip. The LSI may be called an IC, system LSI, super LSI, or ultra LSI depending on its density of integration.

A method of the integration is not limited to LSI, but may be achieved using a dedicated circuit or a general-purpose processor. The integration may be achieved using a field programmable gate array (FPGA), which is programmable after LSI manufacturing, or a reconfigurable processor, in which connection or setting of circuit cells inside the LSI is reconfigurable.

Moreover, any novel integration technology provided to replace LSI by the progress of the semiconductor technology or any technology deriving therefrom may be used for integration of a functional block. A possible replacement is, for example, an application of biotechnology.

The present disclosure provides a preferable radar device that performs detection in a wide-angle range.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A radar device comprising:
a transmitting array antenna;
a receiving array antenna;
a radar transmission circuitry which, in operation, transmits radar signals through the transmitting array antenna; and
a radar receiving circuitry which, in operation, receives reflected wave signals through the receiving array antenna, wherein the reflected wave signals are the radar signals reflected by an object,
wherein,
the transmitting array antenna includes a plurality of transmitting antennas,
the receiving array antenna includes a plurality of receiving antennas,
the plurality of transmitting antennas are arranged at different positions in a first direction,
the plurality of receiving antennas are arranged at different positions in the first direction,
a transmitting antenna pitch, which is a pitch between two adjacent transmitting antennas of the transmitting array antenna, is larger than 1 wavelength in the first direction,
a receiving antenna pitch, which is a pitch between two adjacent receiving antennas of the receiving array antenna, is larger than 1 wavelength in the first direction,
an absolute value of a difference between the transmitting antenna pitch and the receiving antenna pitch is not smaller than 0.5 wavelength and not larger than 0.75 wavelength in the first direction, and
at least one antenna of the plurality of transmitting antennas and the plurality of receiving antennas includes a plurality of antenna elements arranged in the first direction.

2. The radar device according to claim 1, wherein
a size in the first direction of the at least one antenna is greater than the absolute value of the difference between the transmitting antenna pitch and the receiving antenna pitch.

3. The radar device according to claim 1, wherein
a size in the first direction of the at least one antenna is smaller than the transmit antenna pitch and is smaller than the receive antenna pitch.

4. The radar device according to claim 1, wherein
a virtual receiving array antenna based on both the transmitting array antenna and the receiving array antenna has a plurality of virtual receiving antennas, and
one or more virtual receiving antenna pitches, which are pitches between two adjacent antennas among the plurality of virtual receiving antennas, include a pitch of 0.5 wavelengths or more and 0.75 wavelengths or less in the first direction.

5. The radar device according to claim 1, wherein
the wavelength is determined by a frequency of the radar signal.

6. A radar device comprising:
a first array antenna;
a second array antenna;
a radar transmission circuitry which, in operation, transmits radar signals by using one of the first array antenna or the second array antenna; and
a radar receiving circuitry which, in operation, receives reflected wave signals by using another one of the first array antenna or the second array antenna, wherein the reflected wave signals are the radar signals reflected by an object,
wherein,
the first array antenna includes a plurality of first antennas,
the second array antenna includes a plurality of second antennas,
the plurality of first antennas are arranged at different positions in a first direction,
the plurality of second antennas are arranged at different positions in the first direction,
a first antenna pitch, which is a pitch between two adjacent first antennas of the first array antenna, is larger than 1 wavelength in the first direction,
a second antenna pitch, which is a pitch between two adjacent second antennas of the second array antenna, is larger than 1 wavelength in the first direction,
an absolute value of a difference between the first antenna pitch and the second antenna pitch is not smaller than 0.5 wavelength and not larger than 0.75 wavelength in the first direction, and
at least one antenna of the plurality of first antennas and the plurality of second antennas includes a plurality of antenna elements arranged in the first direction.

7. The radar device according to claim 6, wherein
a size in the first direction of the at least one antenna is greater than the absolute value of the difference between the first antenna pitch and the second antenna pitch.

8. The radar device according to claim 6, wherein
a size in the first direction of the at least one antenna is smaller than the first antenna pitch and is smaller than the second antenna pitch.

9. The radar device according to claim 6, wherein
a virtual receiving array antenna based on both the first array antenna and the second array antenna has a plurality of virtual receiving antennas, and
one or more virtual receiving antenna pitches, which are pitches between two adjacent antennas among the plurality of virtual receiving antennas, include a pitch of 0.5 wavelengths or more and 0.75 wavelengths or less in the first direction.

10. The radar device according to claim 6, wherein
the wavelength is determined by a frequency of the radar signal.

* * * * *